(12) United States Patent
Kudoh et al.

(10) Patent No.: US 7,404,782 B2
(45) Date of Patent: Jul. 29, 2008

(54) SPEED REDUCER FOR WALK ASSIST APPARATUS

(75) Inventors: Hiroshi Kudoh, Wako (JP); Hisashi Katoh, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 203 days.

(21) Appl. No.: 10/526,015

(22) PCT Filed: Aug. 29, 2003

(86) PCT No.: PCT/JP03/11103

§ 371 (c)(1),
(2), (4) Date: Oct. 26, 2005

(87) PCT Pub. No.: WO2004/026215

PCT Pub. Date: Apr. 1, 2004

(65) Prior Publication Data

US 2006/0142105 A1    Jun. 29, 2006

(30) Foreign Application Priority Data

| Aug. 30, 2002 | (JP) | ............................. 2002-253510 |
| Aug. 30, 2002 | (JP) | ............................. 2002-253511 |
| Aug. 30, 2002 | (JP) | ............................. 2002-253512 |
| Aug. 30, 2002 | (JP) | ............................. 2002-253513 |

(51) Int. Cl.
*F16H 57/08* (2006.01)

(52) U.S. Cl. ...................... 475/337; 475/903

(58) Field of Classification Search ................. 475/903, 475/337

See application file for complete search history.

(56) References Cited

U.S. PATENT DOCUMENTS 5,993,347 A * 11/1999 Park ........................... 475/280

FOREIGN PATENT DOCUMENTS

| JP | 176480 C2 | 12/1949 |
| JP | 53-7574 A | 3/1978 |
| JP | 61-73861 U | 5/1986 |
| JP | 3-107650 A | 5/1991 |
| JP | 3-121336 A | 5/1991 |
| JP | 4-501227 A | 3/1992 |

(Continued)

*Primary Examiner*—Roger Pang
*Assistant Examiner*—Derek D Knight
(74) *Attorney, Agent, or Firm*—Birch, Stewart, Kolasch & Birch, LLP

(57) ABSTRACT

A reduction gear (49) for a walking assistance system is provided that includes first to third planetary gear mechanisms ($P_1$ to $P_3$) between an input shaft (Si) connected to a motor (48) and an output shaft (So), the second planetary gear mechanism ($P_2$) being disposed radially outside the first planetary gear mechanism ($P_1$) connected to the input shaft (Si), and the third planetary gear mechanism ($P_3$) being disposed outside, in the direction of an axis L, the first planetary gear mechanism ($P_1$). It is therefore possible, while reducing the speed of rotation of the input shaft (Si) in three stages by the first to the third planetary gear mechanisms ($P_1$ to $P_3$) and transmitting the rotation to the output shaft (So), to reduce the thickness of the reduction gear (49) compared with a case in which the first to the third planetary gear mechanisms ($P_1$ to $P_3$) are disposed so as to be stacked in the direction of the axis (L), thereby improving the appearance when a user is fitted with the walking assistance system.

16 Claims, 17 Drawing Sheets

FOREIGN PATENT DOCUMENTS

| | | |
|---|---|---|
| JP | 8-247225 A | 9/1993 |
| JP | 7-163607 A | 6/1995 |
| JP | 11-37226 A | 2/1999 |
| JP | 2002-30124 A | 10/2002 |

* cited by examiner

SPEED REDUCER FOR WALK ASSIST APPARATUS

FIELD OF THE INVENTION

The present invention relates to a walking assistance system that assists elderly people with weakened muscle strength or injured people to walk, climb up and down stairs, stand up from a seated posture, sit down from a standing posture, etc. so as to facilitate movement, thus suppressing degradation in muscle strength and correcting the gait mode, and, in particular, it relates to a reduction gear for the walking assistance system.

BACKGROUND ART

Such a walking assistance system has already been proposed in Japanese Patent Application No. 2001-109046 related to an application of the present applicant. This walking assistance system includes an electric actuator fitted to user's leg joints (i.e., a hip joint and a knee joint), and the actuator is operated by supplying electric power from a power source within a backpack carried by the user on the back so as to generate a joint torque for extending/bending each joint, thus assisting the user in carrying out a movement such as walking.

Furthermore, a reduction gear in which a plurality of planetary gear mechanisms are axially stacked in multiple stages so as to achieve a large reduction ratio with a small size is known from Japanese Patent Application Laid-open No. 8-247225 and Japanese Patent Application Laid-open No. 11-37226.

The above-mentioned conventional walking assistance system includes an actuator integrated with a motor and a reduction gear, and since the reduction gear is required to have a large reduction ratio, there is the problem that the overall dimensions of the actuator increase. As a result, it becomes difficult to fit the actuator under a user's clothing, and since the actuator is exposed outside the clothing, the appearance is poor.

Although the above-mentioned conventional reduction gear, in which the plurality of planetary gear mechanisms are axially stacked in multiple stages, is excellent in having a large reduction ratio, since the axial dimensions are large, it is not suitable for use in an actuator of a walking assistance system.

DISCLOSURE OF INVENTION

The present invention has been accomplished under the above-mentioned circumstances, and it is an object thereof to achieve a thin reduction gear for a walking assistance system while ensuring that the reduction gear has a sufficient reduction ratio.

In order to attain this object, in accordance with a first aspect of the present invention, there is proposed a reduction gear for a walking assistance system that, in order to assist walking movement by extending/bending a user's leg joint, reduces the speed of rotation of an input shaft driven by a motor and transmits the rotation to an output shaft connected to the leg joint, the reduction gear including the input shaft, the output shaft, a first planetary gear mechanism, and a second planetary gear mechanism disposed coaxially on an axis, the second planetary gear mechanism being disposed so as to substantially overlap the radially outer side of the first planetary gear mechanism, the rotation of the input shaft being reduced in speed by the first planetary gear mechanism and the second planetary gear mechanism and transmitted to the output shaft, the first planetary gear mechanism including a first sun gear provided on the input shaft, a first ring gear rotatably disposed so as to surround the outer periphery of the first sun gear, a plurality of first planetary gears meshing simultaneously with the first sun gear and the first ring gear, and a first carrier rotatably supporting the first planetary gears, and the second planetary gear mechanism including a second sun gear provided on the outer periphery of the first ring gear, a second ring gear disposed so as to surround the outer periphery of the second sun gear, a plurality of second planetary gears meshing simultaneously with the second sun gear and the second ring gear, and a second carrier rotatably supporting the second planetary gears.

In accordance with this arrangement, since the input shaft, the output shaft, the first planetary gear mechanism, and the second planetary gear mechanism are disposed coaxially on the axis of the reduction gear for the walking assistance system, and the second planetary gear mechanism is disposed so as to substantially overlap the radially outer side of the first planetary gear mechanism, it is possible, while reducing in speed the rotation of the input shaft in two stages by the first and second planetary gear mechanisms and transmitting it to the output shaft, to reduce the axial thickness of the reduction gear compared with a case in which the first and second planetary gear mechanisms are disposed so as to be stacked in the axial direction, thereby improving the appearance when a user is equipped with the walking assistance system.

Furthermore, in accordance with a second aspect of the present invention, in addition to the first aspect, there is proposed the reduction gear for the walking assistance system wherein the first carrier of the first planetary gear mechanism is fixed to a casing, the second ring gear of the second planetary gear mechanism is fixed to the casing, and the second carrier of the second planetary gear mechanism is connected to the output shaft.

In accordance with this arrangement, fixing the first carrier of the first planetary gear mechanism to the casing enables the rotation input from the first sun gear to be output from the first ring gear, and fixing the second ring gear to the casing enables the rotation input into the second sun gear, which is integral with the first ring gear, to be output from the second carrier, thereby enabling the rotation of the input shaft to be reduced in speed in two stages by the first and second planetary gear mechanisms and transmitted to the output shaft.

Moreover, in accordance with a third aspect of the present invention, in addition to the second aspect, there is proposed the reduction gear for the walking assistance system wherein a third planetary gear mechanism is disposed so as to be coaxial with and axially be stacked on the first planetary gear mechanism and the second planetary gear mechanism, the third planetary gear mechanism including a third sun gear provided on the outer periphery of a central part of the second carrier of the second planetary gear mechanism, a third ring gear fixed to the casing and disposed so as to surround the outer periphery of the third sun gear, a plurality of third planetary gears meshing simultaneously with the third sun gear and the third ring gear, and a third carrier rotatably supporting the third planetary gears and connected to the output shaft.

In accordance with this arrangement, fixing to the casing the third ring gear of the third planetary gear mechanism, which is disposed so as to be coaxial with and axially be stacked on the first and second planetary gear mechanisms, enables the rotation input into the third sun gear, which is integral with the second carrier, to be output to the third carrier, thereby enabling the rotation of the input shaft to be reduced in speed in three stages by the first to the third planetary gear mechanisms and transmitted to the output shaft.

Furthermore, in accordance with a fourth aspect of the present invention, there is proposed a reduction gear for a walking assistance system that, in order to assist walking movement by extending/bending a user's leg joint, reduces the speed of rotation of an input shaft driven by a motor and transmits the rotation to an output shaft connected to the leg joint, the reduction gear including the input shaft, the output shaft, a first planetary gear mechanism, a second planetary gear mechanism, and a third planetary gear mechanism disposed coaxially on an axis, the second planetary gear mechanism being disposed so as to substantially overlap the radially outer side of the first planetary gear mechanism, the third planetary gear mechanism being disposed so as to substantially overlap the radially outer side of the second planetary gear mechanism, the rotation of the input shaft being reduced in speed by the first planetary gear mechanism, the second planetary gear mechanism, and the third planetary gear mechanism and transmitted to the output shaft, the first planetary gear mechanism including a first sun gear provided on the input shaft, a first ring gear formed on the inner periphery of an inside ring member rotatably disposed so as to surround the first sun gear, a plurality of first planetary gears meshing simultaneously with the first sun gear and the first ring gear, and a first carrier fixed to a casing and rotatably supporting the first planetary gears, the second planetary gear mechanism including a second sun gear formed on the outer periphery of the inside ring member, a second ring gear formed on the inner periphery of an outside ring member disposed so as to surround the outer periphery of the second sun gear, a plurality of second planetary gears meshing simultaneously with the second sun gear and the second ring gear, and a second carrier fixed to the casing and rotatably supporting the second planetary gears, and the third planetary gear mechanism including a third sun gear formed on the outer periphery of the outside ring member, a third ring gear fixed to the casing so as to surround the outer periphery of the third sun gear, a plurality of third planetary gears meshing simultaneously with the third sun gear and the third ring gear, and a third carrier rotatably supporting the third planetary gears and connected to the output shaft.

In accordance with this arrangement, while the input shaft, the output shaft, the first planetary gear mechanism, the second planetary gear mechanism, and the third planetary gear mechanism are disposed coaxially on the axis of the reduction gear for the walking assistance system, fixing the first carrier of the first planetary gear mechanism to the casing enables the rotation input from the input shaft into the first sun gear to be output from the first ring gear; fixing the second carrier to the casing enables the rotation input into the second sun gear, which is integral with the first ring gear, to be output from the second ring gear; and fixing the third ring gear to the casing enables the rotation input into the third sun gear, which is integral with the second ring gear, to be output from the third carrier, thereby enabling the rotation of the input shaft to be reduced in speed in three stages by the first to the third planetary gear mechanisms and transmitted to the output shaft. Furthermore, since the second planetary gear mechanism is disposed so as to substantially overlap the radially outer side of the first planetary gear mechanism, and the third planetary gear mechanism is disposed so as to substantially overlap the radially outer side of the second planetary gear mechanism, it is possible, while reducing in speed the rotation of the input shaft in three stages by the first to the third planetary gear mechanisms and transmitting it to the output shaft, to reduce the axial thickness of the reduction gear compared with a case in which the first to the third planetary gear mechanisms are all disposed so as to be stacked in the axial direction, thereby improving the appearance when the user is equipped with the walking assistance system.

Moreover, in accordance with a fifth aspect of the present invention, there is proposed a reduction gear for a walking assistance system that, in order to assist walking movement by extending/bending a user's leg joint, reduces the speed of rotation of an input shaft driven by a motor and transmits the rotation to an output shaft connected to the leg joint, the reduction gear including the input shaft, the output shaft, a first planetary gear mechanism, a lo second planetary gear mechanism, and a third planetary gear mechanism disposed coaxially on an axis, the second planetary gear mechanism being disposed so as to substantially overlap the radially outer side of the first planetary gear mechanism, the third planetary gear mechanism being disposed so as to substantially overlap the radially outer side of the second planetary gear mechanism, the rotation of the input shaft being reduced in speed by the first planetary gear mechanism, the second planetary gear mechanism, and the third planetary gear mechanism and transmitted to the output shaft, the first planetary gear mechanism including a first sun gear provided on the input shaft, a first ring gear fixed to a casing so as to surround the first sun gear, a plurality of first planetary gears meshing simultaneously with the first sun gear and the first ring gear, and a first carrier rotatably supporting the first planetary gears, the second planetary gear mechanism including a second sun gear formed on the outer periphery of the first carrier, a second ring gear fixed to the casing so as to surround the outer periphery of the second sun gear, a plurality of second planetary gears meshing simultaneously with the second sun gear and the second ring gear, and a second carrier rotatably supporting the second planetary gears, and the third planetary gear mechanism including a third sun gear formed on the outer periphery of the second carrier, a third ring gear fixed to the casing so as to surround the outer periphery of the third sun gear, a plurality of third planetary gears meshing simultaneously with the third sun gear and the third ring gear, and a third carrier rotatably supporting the third planetary gears and connected to the output shaft.

In accordance with this arrangement, while the input shaft, the output shaft, the first planetary gear mechanism, the second planetary gear mechanism, and the third planetary gear mechanism are disposed coaxially on the axis of the reduction gear for the walking assistance system, fixing the first ring gear of the first planetary gear mechanism to the casing enables the rotation input from the first sun gear to be output from the first carrier; fixing the second ring gear to the casing enables the rotation input into the second sun gear, which is integral with the first carrier, to be output from the second carrier; and fixing the third ring gear to the casing enables the rotation input to the third sun gear, which is integral with the second carrier, to be output from the third carrier, thereby enabling the rotation of the input shaft to be reduced in speed in three stages by the first to the third planetary gear mechanisms and transmitted to the output shaft. Furthermore, since the second planetary gear mechanism is disposed so as to substantially overlap the radially outer side of the first planetary gear mechanism, and the third planetary gear mechanism is disposed so as to substantially overlap the radially outer side of the second planetary gear mechanism, it is possible, while reducing in speed the rotation of the input shaft in three stages by the first to the third planetary gear mechanisms and transmitting it to the output shaft, to reduce the axial thickness of the reduction gear compared with a case in which the first to the third planetary gear mechanisms are all disposed so as to be stacked in the axial direction, thereby improving the appearance when the user is equipped with the walking assistance system.

Moreover, in accordance with a sixth aspect of the present invention, there is proposed a reduction gear for a walking assistance system that, in order to assist walking movement by extending/bending a user's leg joint, reduces the speed of rotation of an input shaft driven by a motor and transmits the rotation to an output shaft connected to the leg joint, the reduction gear including the input shaft, the output shaft, a first planetary gear mechanism, a second planetary gear mechanism, and a third planetary gear mechanism disposed coaxially on an axis, the second planetary gear mechanism being disposed so as to substantially overlap the radially outer side of the first planetary gear mechanism, the third planetary gear mechanism being disposed so as to be stacked on the first planetary gear mechanism and the second planetary gear mechanism in the axial direction, the rotation of the input shaft being reduced in speed by the first planetary gear mechanism, the second planetary gear mechanism, and the third planetary gear mechanism and transmitted to the output shaft, the first planetary gear mechanism including a first sun gear provided on the input shaft, a first ring gear fixed to a casing so as to surround the outer periphery of the first sun gear, a plurality of first planetary gears meshing simultaneously with the first sun gear and the first ring gear, and a first carrier rotatably supporting the first planetary gears, the second planetary gear mechanism including a second sun gear provided on the outer periphery of the first carrier, a second ring gear fixed to the casing so as to surround the outer periphery of the second sun gear, a plurality of second planetary gears meshing simultaneously with the second sun gear and the second ring gear, and a second carrier rotatably supporting the second planetary gears, and the third planetary gear mechanism including a third sun gear provided on the outer periphery of a central part of the second carrier, a third ring gear fixed to the casing so as to surround the outer periphery of the third sun gear, a plurality of third planetary gears meshing simultaneously with the third sun gear and the third ring gear, and a third carrier rotatably supporting the third planetary gears and connected to the output shaft.

In accordance with this arrangement, while the input shaft, the output shaft, the first planetary gear mechanism, the second planetary gear mechanism, and the third planetary gear mechanism are disposed coaxially on the axis of the reduction gear for the walking assistance system, fixing the first ring gear of the first planetary gear mechanism to the casing enables the rotation input from the input shaft into the first sun gear to be output from the first carrier; fixing the second ring gear to the casing enables the rotation input into the second sun gear, which is integral with the first carrier, to be output from the second carrier; and fixing the third ring gear to the casing enables the rotation input into the third sun gear, which is integral with the second carrier, to be output from the third carrier, thereby enabling the rotation of the input shaft to be reduced in speed in three stages by the first to the third planetary gear mechanisms and transmitted to the output shaft. Furthermore, since the second planetary gear mechanism is disposed so as to substantially overlap the radially outer side of the first planetary gear mechanism, and the third planetary gear mechanism is disposed so as to be stacked on the first planetary gear mechanism and the second planetary gear mechanism in the axial direction, it is possible, while reducing in speed the rotation of the input shaft in three stages by the first to the third planetary gear mechanisms and transmitting it to the output shaft, to reduce the axial thickness of the reduction gear compared with a case in which the first to the third planetary gear mechanisms are all disposed so as to be stacked in the axial direction, thereby improving the appearance when the user is equipped with the walking assistance system.

BRIEF DESCRIPTION OF DRAWINGS

FIG. 1 is a diagram showing a walking assistance system in use, FIG. 2 is a first part view of an exploded perspective view of the walking assistance system, FIG. 3 is a second part view of the exploded perspective view of the walking assistance system, FIG. 4 is a vertical sectional view of an electric actuator of the walking assistance system, FIG. 5 is a sectional view along line 5-5 in FIG. 4, FIG. 6 is a sectional view along line 6-6 in FIG. 4, and FIG. 7 is a skeleton diagram of the electric actuator of the walking assistance system.

FIG. 8 is a vertical sectional view of an electric actuator of a walking assistance system, FIG. 9 is a sectional view along line 9-9 in FIG. 8, and FIG. 10 is a skeleton diagram of the electric actuator of the walking assistance system.

FIG. 11 is a vertical sectional view of an electric actuator of a walking assistance system, FIG. 12 is a sectional view along line 12-12 in FIG. 11, and FIG. 13 is a skeleton diagram of the electric actuator of the walking assistance system.

FIG. 14 is a vertical sectional view of an electric actuator of a walking assistance system, FIG. 15 is a sectional view along line 15-15 in FIG. 14, FIG. 16 is a sectional view along line 16-16 in FIG. 14, and FIG. 17 is a skeleton diagram of the electric actuator of the walking assistance system.

BEST MODE FOR CARRYING OUT THE INVENTION

A first embodiment of the present invention is explained below with reference to FIG. 1 to FIG. 7.

Figure 1:
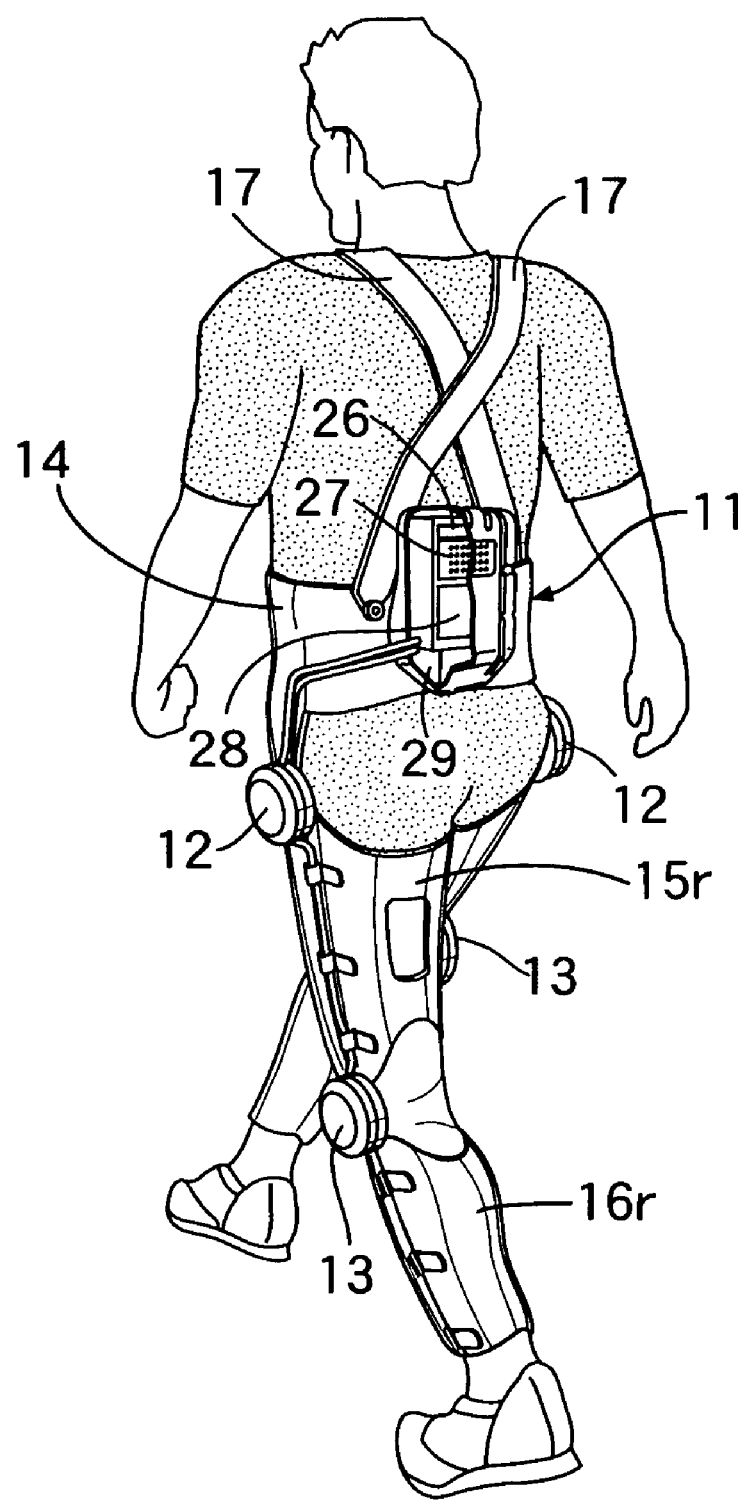
FIG. 1 to FIG. 7 show a first embodiment of the present invention.
Figure 2:
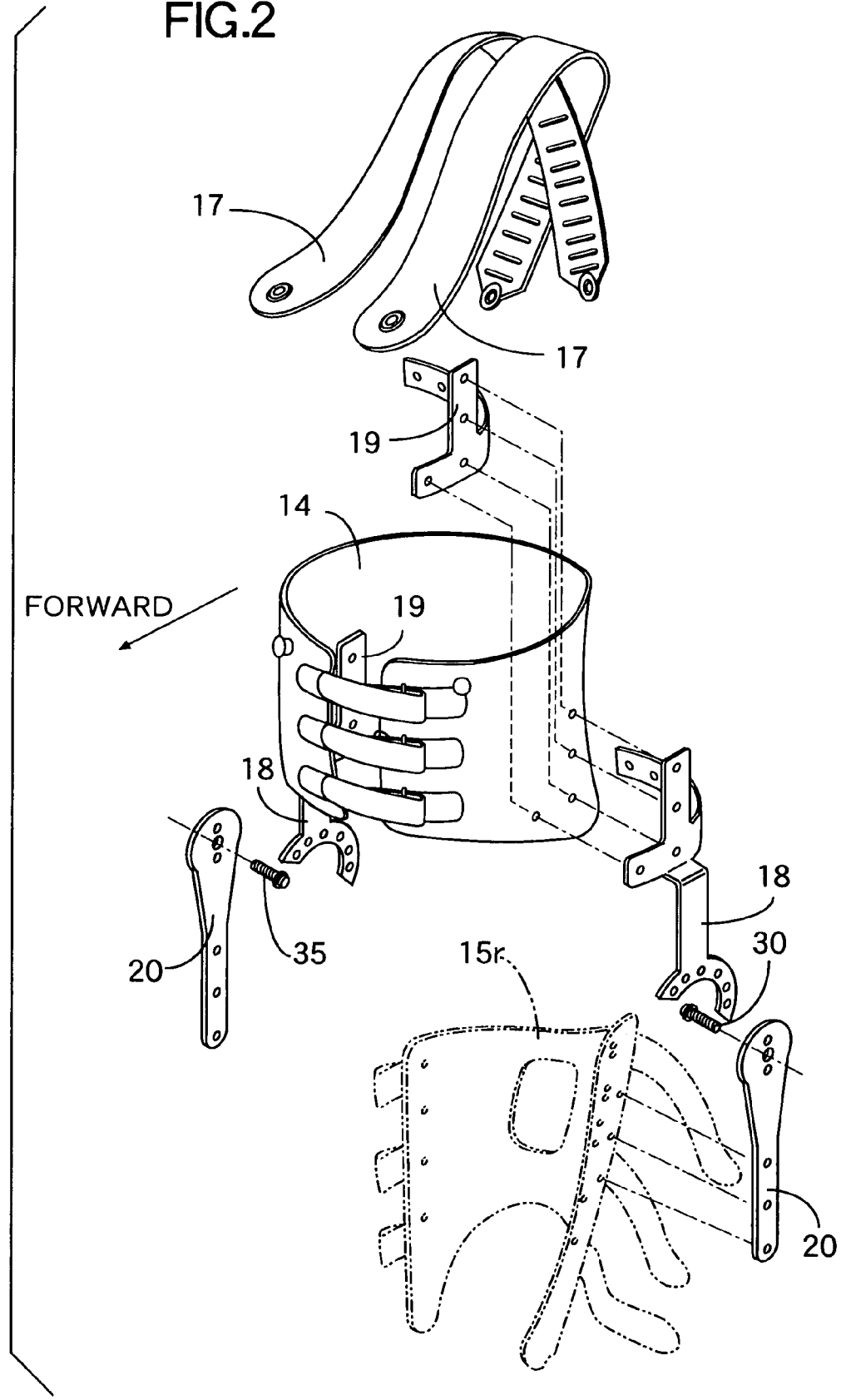
Figure 3:
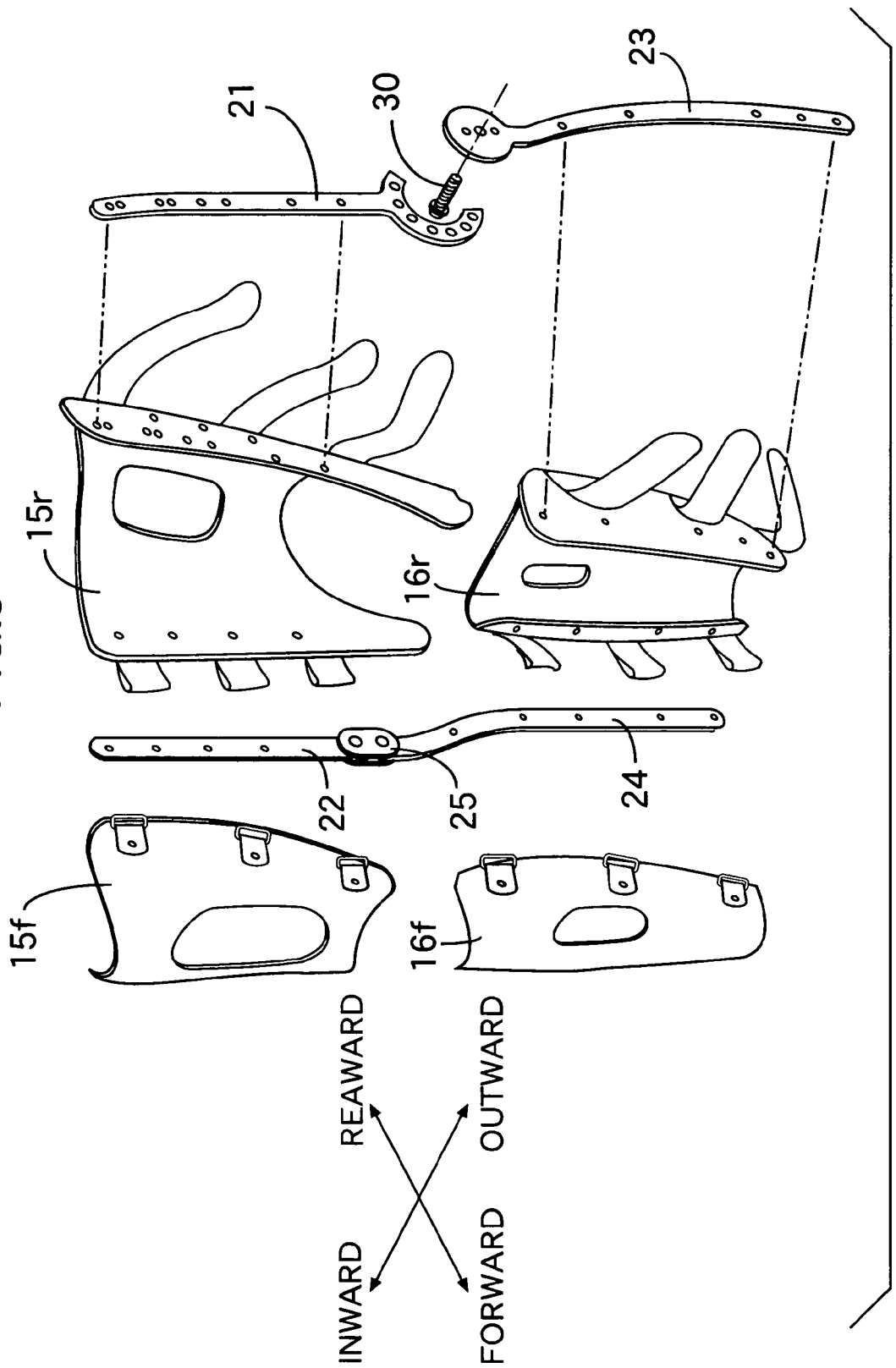
Figure 4:
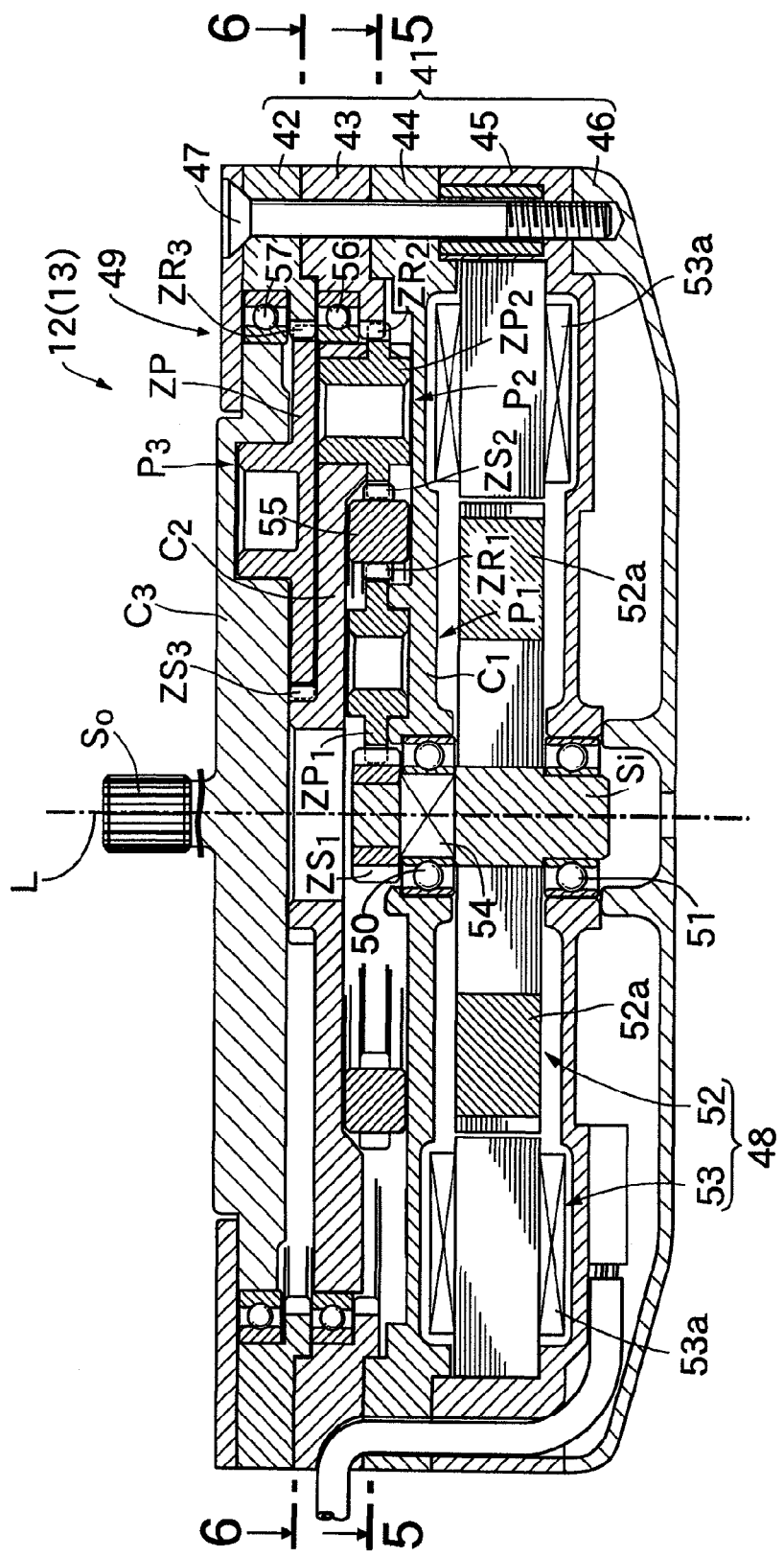
Figure 5:
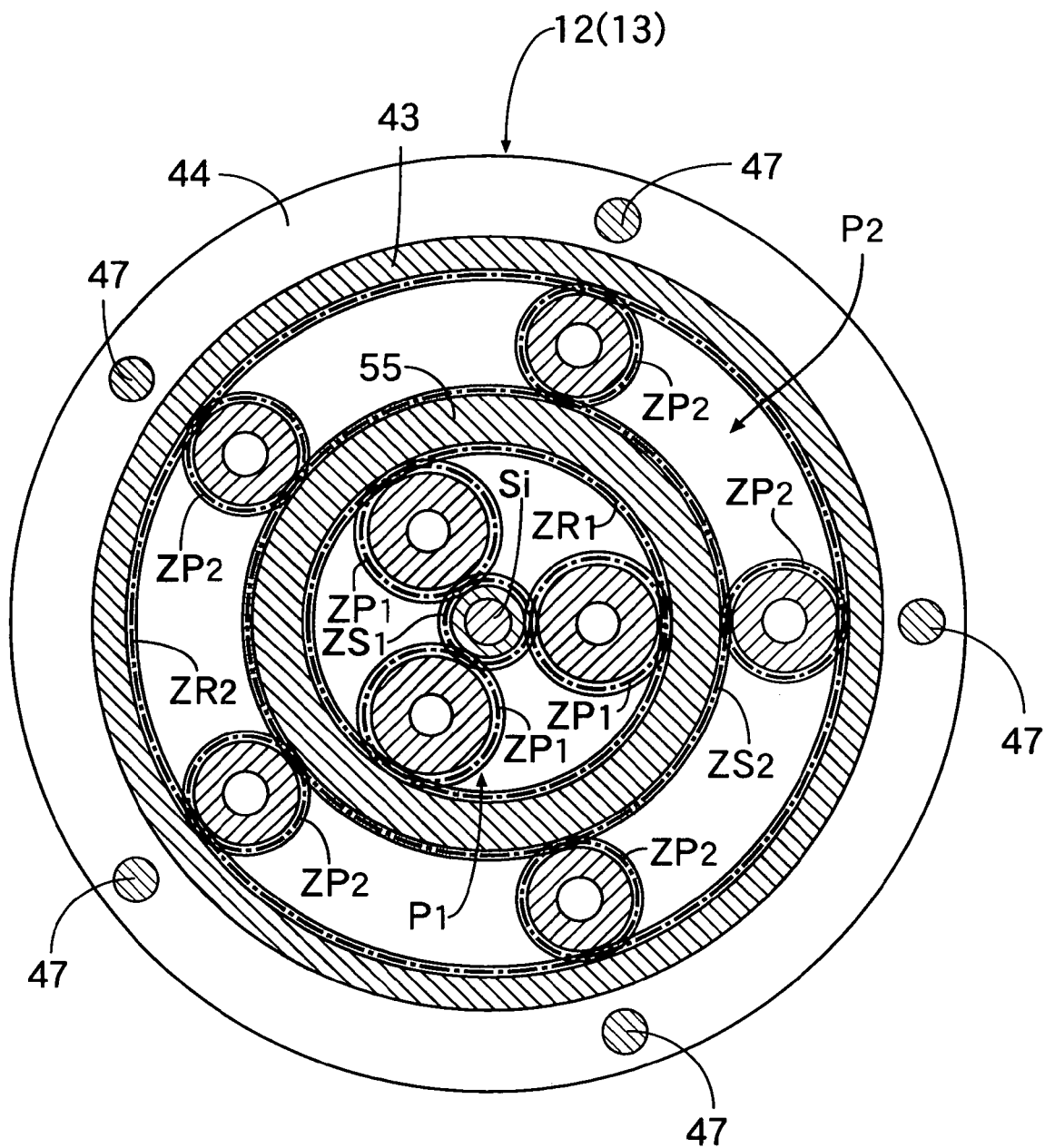
Figure 6:
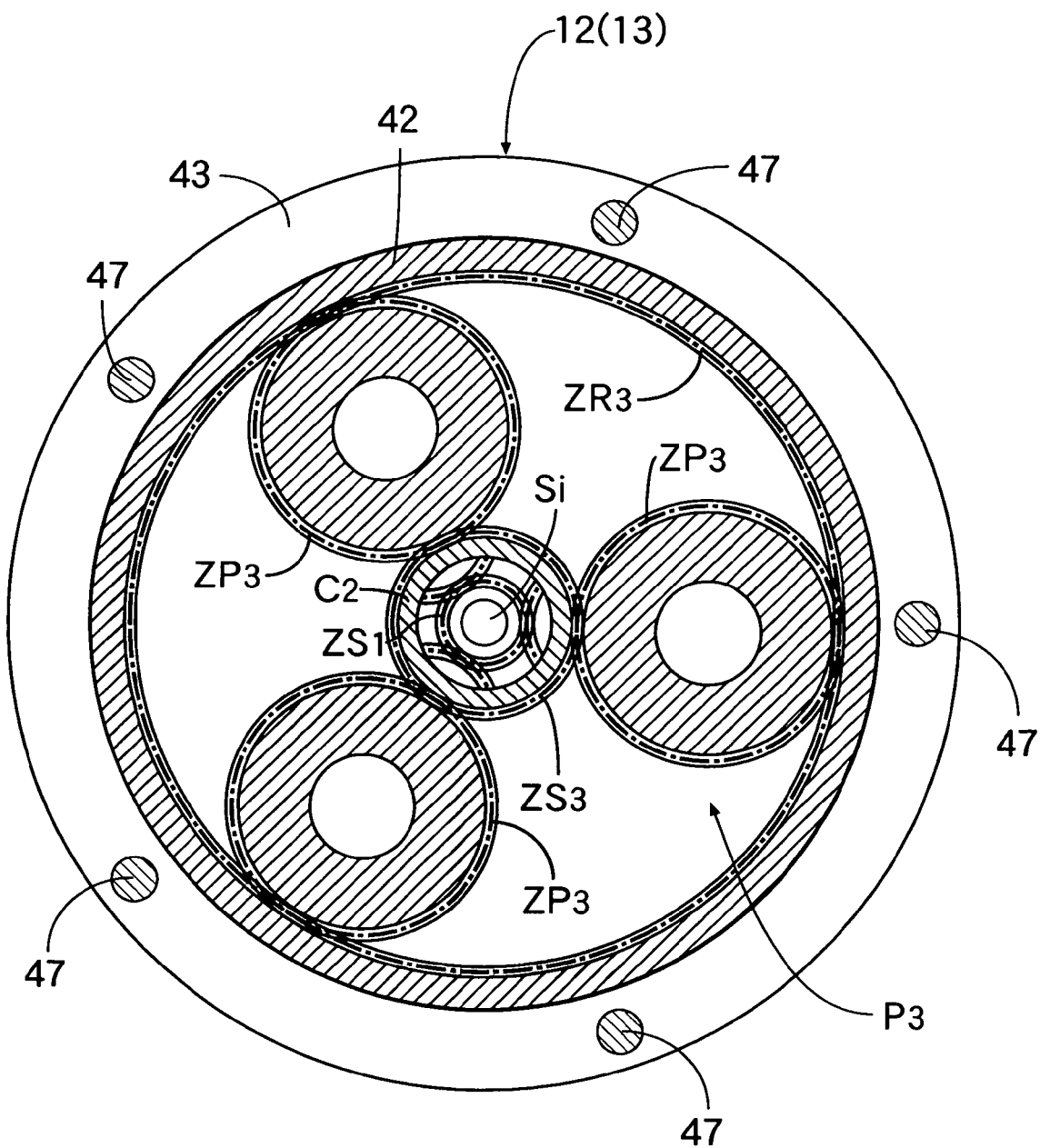
Figure 7:
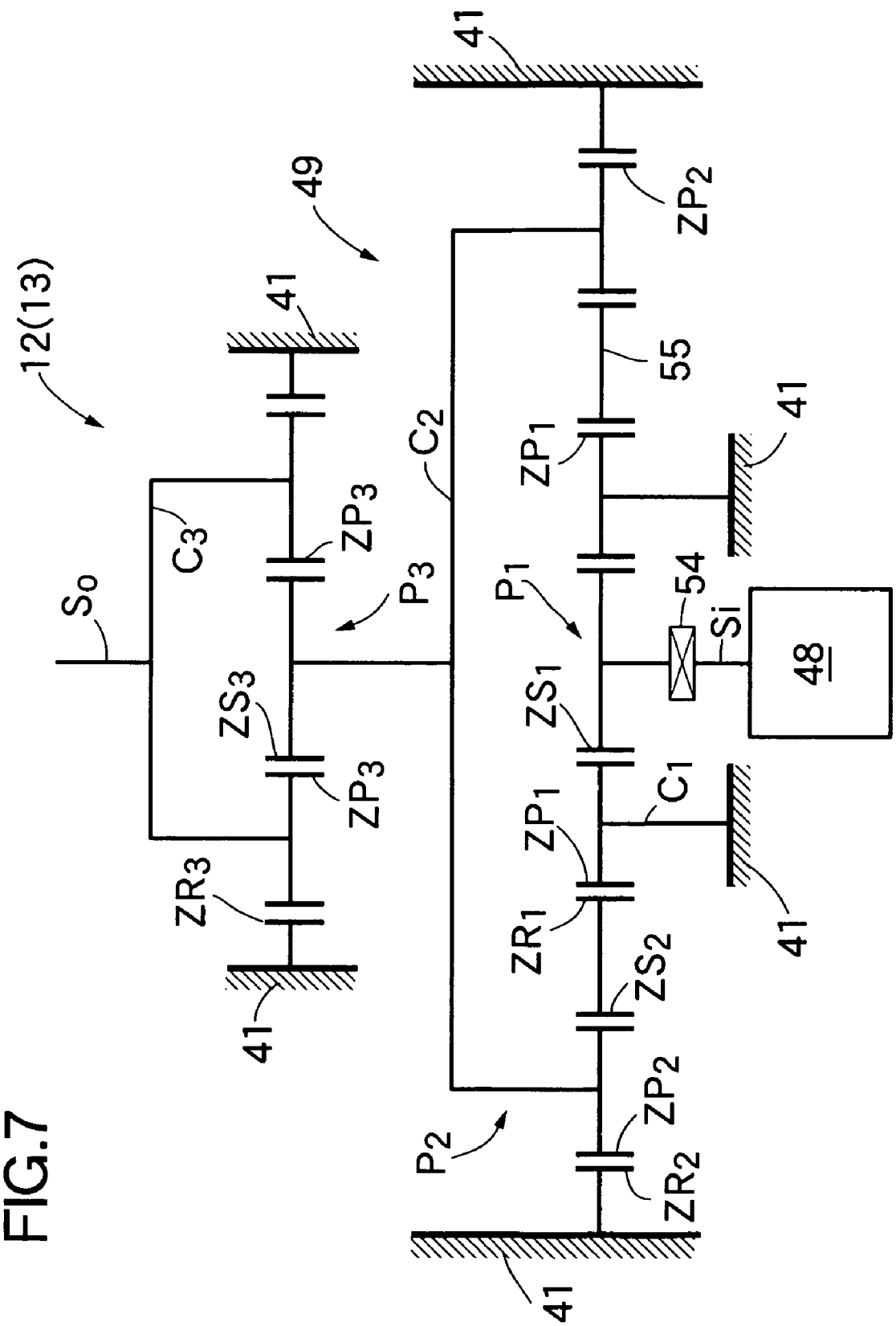

As shown in FIG. 1 to FIG. 3, a walking assistance system of the present invention includes a backpack 11 carried by a user on the back, a pair of left and right first electric actuators 12 applying a torque to left and right hip joints, a pair of left and right second electric actuators 13 applying a torque to left and right knee joints, an abdominal belt 14 made of a flexible resin and detachably fitted around the user's abdomen, upper leg supports 15*f* and 15*r* made of a flexible resin, split into front and rear portions, and detachably fitted around the user's left and right thighs, lower leg supports 16*f* and 16*r* made of a flexible resin, split into front and rear portions, and detachably fitted around the user's left and right lower legs, and two suspenders 17 extending from a front part of the abdominal belt 14 and connected to a rear part of the abdominal belt 14 via the user's shoulders. FIG. 3 shows the upper leg supports 15*f* and 15*r* and the lower leg supports 16*f* and 16*r* for a left leg, and those for a right leg, which are not illustrated, are laterally symmetrical and have the same structure.

A first link 18 and a reinforcing member 19 are secured by bolts so as to hold an outer face and an inner face of each of left and right sides of the abdominal belt 14 therebetween. A second link 20 bendably connected to the lower end of the first link 18 via the first electric actuator 12 is secured by bolts to the outside of the rear upper leg support 15r. In this arrangement, a pivoting support for the first link 18 and the second link 20, that is, the first electric actuator 12, is positioned outside the user's hip joint.

An outside third link 21 and an inside third link 22 are secured by bolts to the outside and the inside respectively of the rear upper leg support 15r, and an outside fourth link 23 and an inside fourth link 24 are secured by bolts to the outside and the inside respectively of the rear lower leg support 16r. The lower end of the outside third link 21 and the upper end of the outside fourth link 23 are bendably connected to each other via the second electric actuator 13, and the lower end of the inside third link 22 and the upper end of the inside fourth link 24 are bendably connected to each other via a hinge 25. In this arrangement, pivoting supports of the two third links 21 and 22 and the two fourth links 23 and 24, that is, the second electric actuator 13 and the hinge 25, are positioned on the outside and the inside of the user's knee joint.

Housed within the backpack 11, which is detachably fitted to the suspenders 17, are an electronic control unit 26 for controlling the operation of the first electric actuators 12 and the second electric actuators 13, an indicator 27 for indicating the state of torque generated by each of the actuators 12 and 13, a motor driver 28 for driving a motor of each of the actuators 12 and 13, and a power source 29 (e.g., an Ni—Zn battery) for supplying electric power to the motors and the electronic control unit 26.

The first electric actuators 12 and the second electric actuators 13 have a common structure, and are formed from a DC motor and a reduction gear, a casing thereof is secured by bolts to the lower end of the first link 18, and an output shaft thereof is joined by a bolt 30 to the upper end of the second link 20. Driving the first electric actuator 12 therefore generates a torque for rotating the second link 20 relative to the first link 18, thus enabling the user's hip joint to be extended/bent. Furthermore, the second electric actuator 13 has a casing thereof secured by bolts to the lower end of the outside third link 21 and an output shaft thereof joined to the upper end of the outside fourth link 23 by a bolt 30. Driving the second electric actuator 13 therefore generates a torque for rotating the outside fourth link 23 relative to the outside third link 21, thus enabling the user's knee joint to be extended/bent.

The structure of the first electric actuator 12 is now explained with reference to FIG. 4 to FIG. 7. The structure of the second electric actuator 13 is the same as that of the first electric actuator 12.

A casing 41 of the first electric actuator 12 is formed in a bottomed cylindrical shape having an axis L as the center. The casing 41 is formed by layering a first support ring 42, a second support ring 43, a support plate 44, a motor housing 45, and a motor cover 46 and integrally securing them with a plurality of bolts 47. A motor 48 is housed within the motor housing 45 and the motor cover 46, and a reduction gear 49 is housed within the first support ring 42 and the second support ring 43. An input shaft Si of the reduction gear 49 is supported on the support plate 44 and the motor housing 45 via ball bearings 50 and 51, a rotor 52 of the motor 48 is fixed to the input shaft Si, is and a stator 53 surrounding the outer periphery of the rotor 52 is fixed to the motor housing 45. A permanent magnet 52a and a coil 53a are provided on the rotor 52 and the stator 53 respectively, and when the coil 53a is energized, the input shaft Si rotates together with the rotor 52.

The reduction gear 49 includes a first planetary gear mechanism $P_1$ and a second planetary gear mechanism $P_2$ housed inside the second support ring 43, and a third planetary gear mechanism $P_3$ housed inside the first support ring 42. The first planetary gear mechanism $P_1$ is disposed radially inside the second planetary gear mechanism $P_2$, and the third planetary gear mechanism $P_3$ is disposed outside, in the axis L direction, the first and second planetary gear mechanisms $P_1$ and $P_2$.

The first planetary gear mechanism $P_1$ includes a first sun gear $ZS_1$, a first ring gear $ZR_1$, a plurality of first planetary gears $ZP_1$, and a first carrier $C_1$. The first sun gear $ZS_1$ is connected to a shaft end of the input shaft Si via an electromagnetic clutch 54. The first ring gear $ZR_1$ is formed integrally with the inner periphery of a ring member 55 disposed rotatably around the axis L. The first carrier $C_1$, which rotatably supports the first planetary gears $ZP_1$ meshing simultaneously with the first sun gear $ZS_1$ and the first ring gear $ZR_1$, is formed as part of the support plate 44. The first planetary gear mechanism $P_1$ is therefore of a star type in which the first carrier $C_1$ is fixed and the first ring gear $ZR_1$ is rotatable, and when the first sun gear $ZS_1$, which is connected to the input shaft Si via the electromagnetic clutch 54, rotates, the rotation is reduced in speed and reversed, and output to the first ring gear $ZR_1$ (i.e., the ring member 55).

The reduction ratio of the star type first planetary gear mechanism $P_1$ is defined as $nr_1/ns_1$, where ns, is an input rotational speed of the first sun gear $ZS_1$ and $nr_1$ is an output rotational speed of the first ring gear $ZR_1$. If $zs_1$, $zr_1$, is and $zp_1$ denote the number of teeth of the first sun gear $ZS_1$, the first ring gear $ZR_1$, and the first planetary gear $ZP_1$ respectively, the reduction ratio $nr_1/ns_1$ is given by $$nr_1/ns_1 = -zs_1/zr_1. \quad (1)$$

The minus sign of the right-hand side of Equation (1) indicates that the direction of rotation of the first ring gear $ZR_1$ is opposite to the direction of rotation of the first sun gear $ZS_1$.

The second planetary gear mechanism $P_2$ includes a second sun gear $ZS_2$, a second ring gear $ZR_2$, a plurality of second planetary gears $ZP_2$, and a second carrier $C_2$. The second sun gear $ZS_2$ is formed on the outer periphery of the ring member 55, on the inner periphery of which is formed the first ring gear $ZR_1$. The second ring gear $ZR_2$ is formed integrally with the inner periphery of the second support ring 43, which is fixed to the casing 41. The second carrier $C_2$, which rotatably supports the second planetary gears $ZP_2$ meshing simultaneously with the second sun gear $ZS_2$ and the second ring gear $ZR_2$, is rotatably supported on the inner periphery of the second support ring 43 via a ball bearing 56. The second planetary gear mechanism $P_2$ is therefore of a planetary type in which the second ring gear $ZR_2$ is fixed and the second carrier $C_2$ is rotatable, and when the second sun gear $ZS_2$, which is an input member, rotates, the rotation is reduced in speed and output in the same rotational sense to the second carrier $C_2$.

The reduction ratio of the planetary type second planetary gear mechanism $P_2$ is defined as $nc_2/ns_2$, where $ns_2$ is an input rotational speed of the second sun gear ZS and $nc_2$ is an output rotational speed of the second carrier $C_2$. If $zs_2$, $zr_2$, and $zp_2$ denote the number of teeth of the second sun gear $ZS_2$, the second ring gear $ZR_2$, and the second planetary gear $ZP_2$ respectively, the reduction ratio $nc_2/ns_2$ is given by $$nc_2/ns_2 = zs_2/(zs_2 + zr_2). \quad (2)$$

The third planetary gear mechanism $P_3$ includes a third sun gear $ZS_3$, a third ring gear $ZR_3$, a plurality of third planetary gears $ZP_3$, and a third carrier $C_3$. The third sun gear $ZS_3$ is formed integrally with the outer periphery of a central part of the second carrier $C_2$ of the second planetary gear mechanism $P_2$. The third ring gear $ZR_3$ is formed integrally with the inner periphery of the first support ring 42, which is fixed to the casing 41. The third carrier $C_3$, which rotatably supports the third planetary gears $ZP_3$ meshing simultaneously with the third sun gear $ZS_3$ and the third ring gear $ZR_3$, is rotatably supported on the inner periphery of the first support ring 42 via a ball bearing 57. The third planetary gear mechanism $P_3$ is therefore of a planetary type in which the third ring gear $ZR_3$ is fixed and the third carrier $C_3$ is rotatable, and when the third sun gear $ZS_3$, which is an input member, rotates, the rotation is reduced in speed and output in the same rotational sense to the output shaft So, which is integral with the third carrier $C_3$.

The reduction ratio of the planetary type third planetary gear mechanism $P_3$ is defined as $nc_3/ns_3$, where $ns_3$ denotes an input rotational speed of the third sun gear $ZS_3$ and $nc_3$ denotes an output rotational speed of the third carrier $C_3$. If $zs_3$, $zr_3$, and $zp_3$ denote the number of teeth of the third sun gear $ZS_3$, the third ring gear $ZR_3$, and the third planetary gear $ZP_3$ respectively, the reduction ratio $nc_3/ns_3$ is given by $$nc_3/ns_3 = zs_3/(zs_3 + zr_3). \tag{3}$$

Since the output rotational speed $nr_1$ of the first ring gear $ZR_1$, which is the output member of the first planetary gear mechanism $P_1$, is equal to the input rotational speed $ns_2$ of the second sun gear $ZS_2$, which is the input member of the second planetary gear mechanism $P_2$, and the output rotational speed $nc_2$ of the second carrier $C_2$, which is the output member of the second planetary gear mechanism $P_2$, is equal to the input rotational speed $ns_3$ of the third sun gear $ZS_3$, which is the input member of the third planetary gear mechanism $P_3$, the product of the reduction ratio $nr_1/ns_1$ of the first planetary gear mechanism $P_1$ shown in Equation (1), the reduction ratio $nc_2/ns_2$ of the second planetary gear mechanism $P_2$ shown in Equation (2), and the reduction ratio $nc_3/ns_3$ of the third planetary gear mechanism $P_3$ shown in Equation (3) is given by the ratio $nc_3/ns_1$ of the rotational speed $nc_3$ of the third carrier $C_3$ of the third planetary gear mechanism $P_3$, the third carrier $C_3$ being the output member of the reduction gear 49, relative to the rotational speed $ns_1$ of the first sun gear $ZS_1$ of the first planetary gear mechanism $P_1$, the first sun gear $ZS_1$ being the input member of the reduction gear 49.

$$(nr_1/ns_1) \times (nc_2/ns_2) \times (nc_3/ns_3) = nc_3/ns_1 \tag{4}$$

From Equation (1) to Equation (3), the reduction ratio $nc_3/ns_1$ of the reduction gear 49 is given by $$nc_3/ns_1 = (-zs_1/zr_1) \times \{zs_2/(zs_2+zr_2)\} \times \{zs_3/(zs_3+zr_3)\} \tag{5}$$

and in the embodiment, since the number of teeth of each gear is set as follows:

| | | |
|---|---|---|
| $zs_1 = 18$ | $zp_1 = 27$ | $zr_1 = 72$ |
| $zs_2 = 96$ | $zp_2 = 24$ | $zr_2 = 144$ |
| $zs_3 = 36$ | $zp_3 = 54$ | $zr_3 = 144$, | the reduction ratio $nc_3/ns_1$ of the reduction gear 49 obtained by substituting these numbers of teeth in Equation (5) is 1/50. That is, when the input shaft Si of the reduction gear 49 rotates 50 times, the output shaft So rotates once in the opposite direction.

As hereinbefore described, since the reduction gear 49 is formed by connecting the first to the third planetary gear mechanisms $P_1$ to $P_3$, it is possible to increase the torque of the motor 48 while ensuring that there is a sufficient reduction ratio. Furthermore, since the second planetary gear mechanism $P_2$ is disposed so as to overlap the radially outer side of the first planetary gear mechanism $P_1$, it is possible to reduce the thickness in the axis L direction of the reduction gear 49 compared with a case in which the first to the third planetary gear mechanisms $P_1$ to $P_3$ are all disposed so as to be stacked in the axis L direction. That is, the first electric actuators 12 and the second electric actuators 13 can be made compact by suppressing the thickness of the reduction gear 49 to a thickness corresponding to two planetary gear mechanisms while ensuring that there is a reduction ratio corresponding to three planetary gear mechanisms, thereby enabling fitting under a user's clothing with a good appearance.

Figure 8:
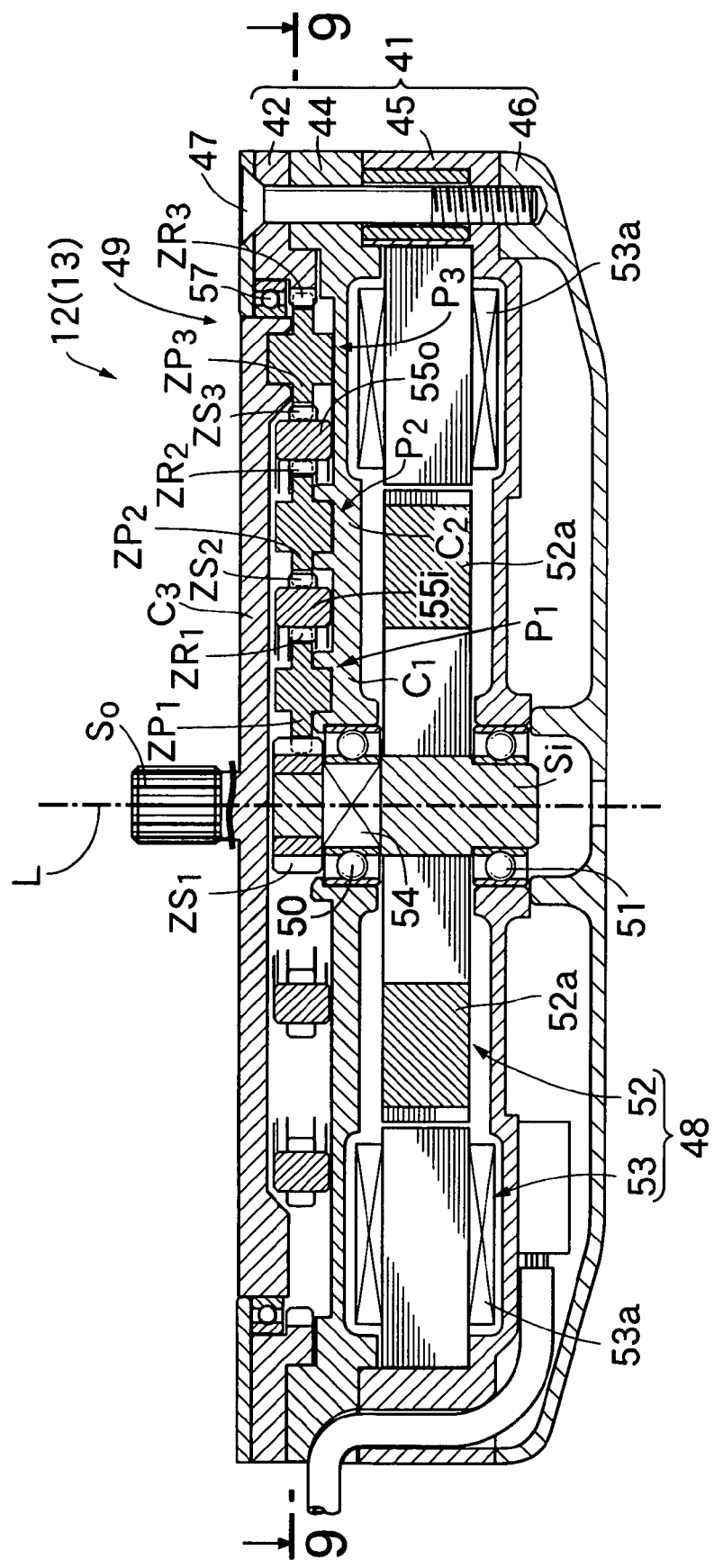
FIG. 8 to FIG. 10 show a second embodiment of the present invention.
Figure 9:
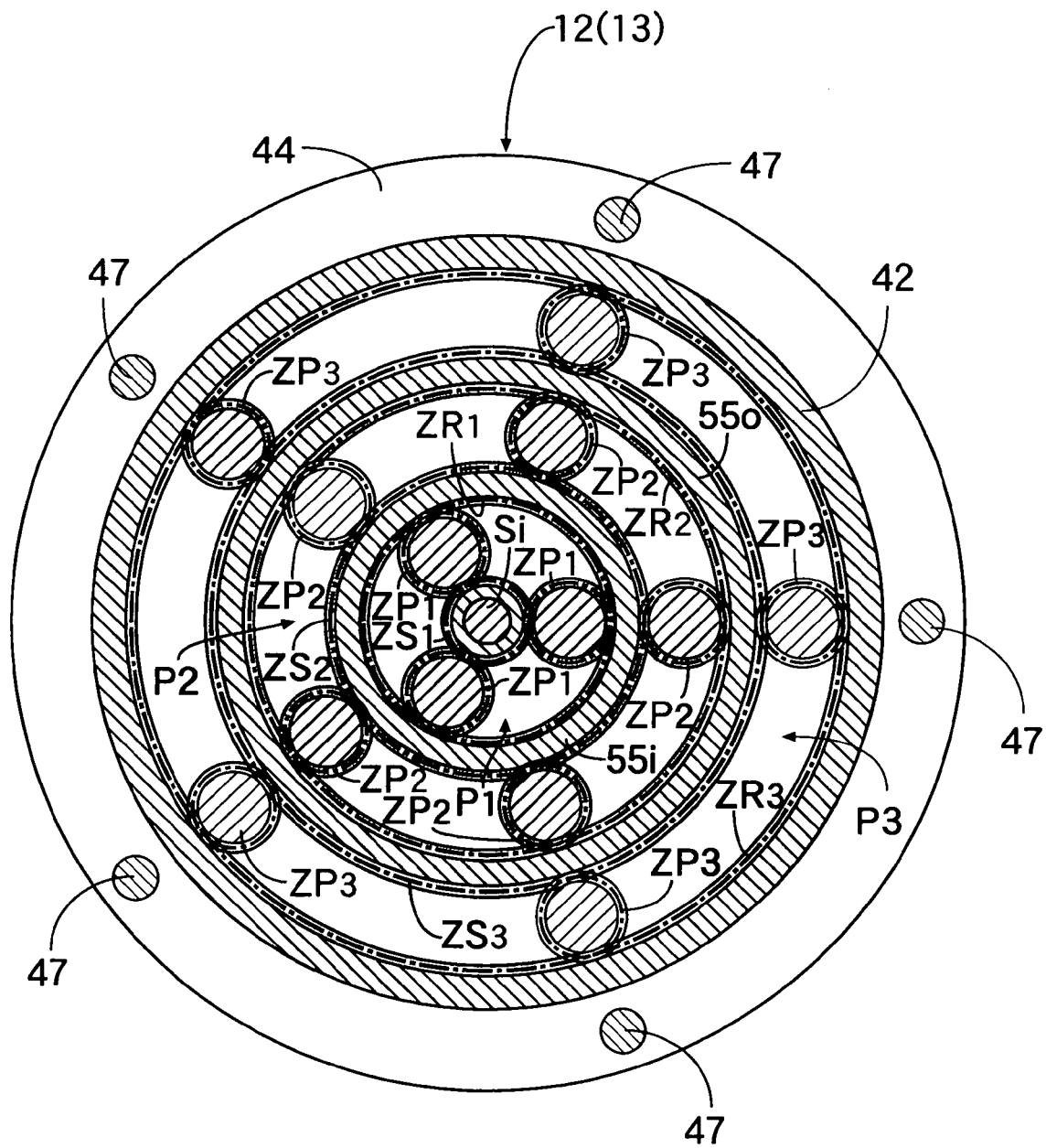
Figure 10:
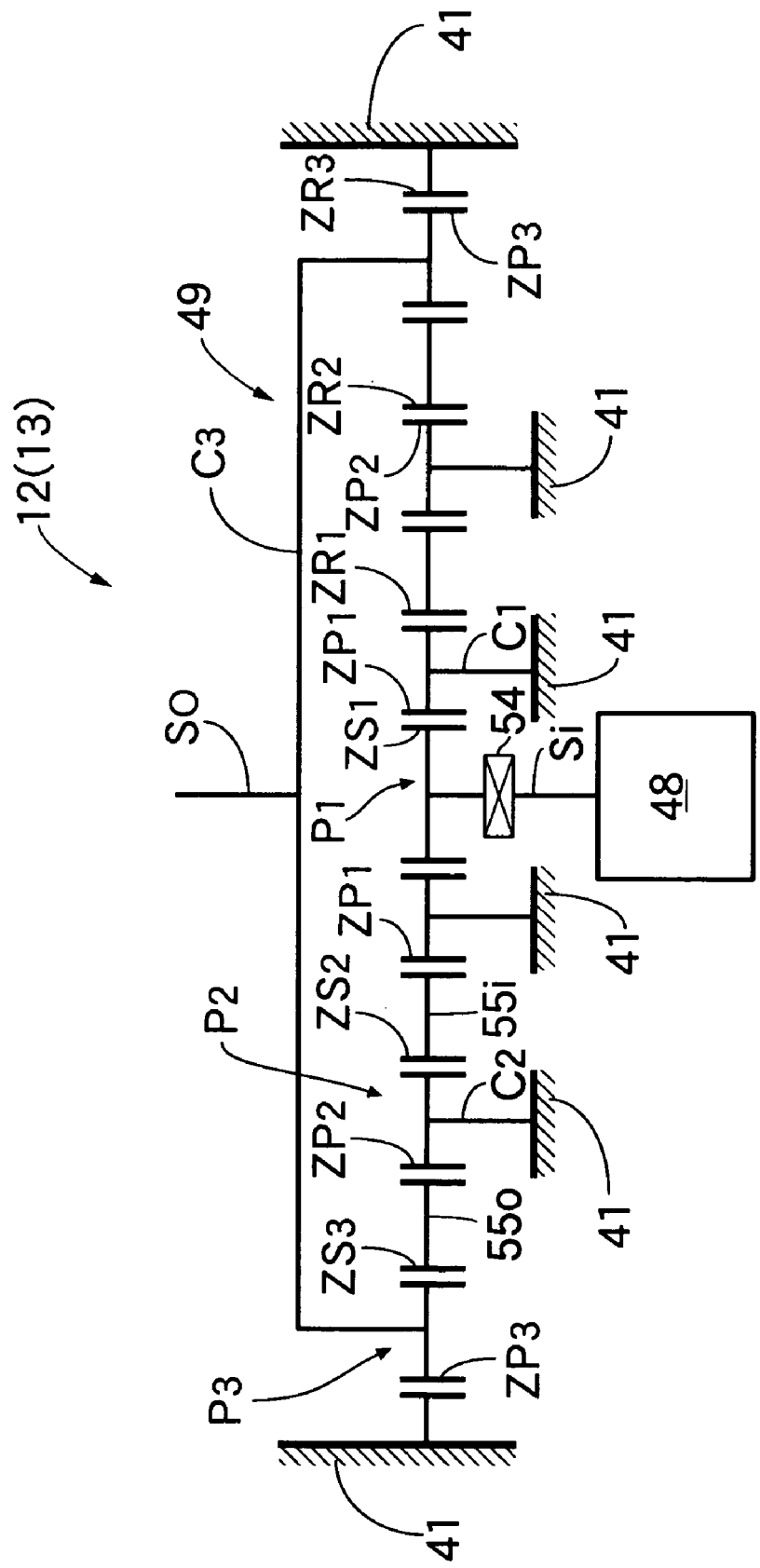

The structure of a first electric actuator 12 related to a second embodiment of the present invention is now explained with reference to FIG. 8 to FIG. 10. The structure of a second electric actuator 13 is the same as that of the first electric actuator 12.

A casing 41 of the first electric actuator 12 is formed in a bottomed cylindrical shape having an axis L as the center. The casing 41 is formed by layering a support ring 42, a support plate 44, a motor housing 45, and a motor cover 46 and integrally securing them with a plurality of bolts 47. A motor 48 is housed within the motor housing 45 and the motor cover 46, and a reduction lo gear 49 is housed within the support ring 42. An input shaft Si of the reduction gear 49 is supported on the support plate 44 and the motor cover 46 via ball bearings 50 and 51, a rotor 52 of the motor 48 is fixed to the input shaft Si, and a stator 53 surrounding the outer periphery of the rotor 52 is fixed to the motor housing 45. A permanent magnet 52a and a coil 53a are provided on the rotor 52 and the stator 53 respectively, and when the coil 53a is energized, the input shaft Si rotates together with the rotor 52.

The reduction gear 49, which is housed within the support ring 42, includes a first planetary gear mechanism $P_1$, a second planetary gear mechanism $P_2$, and a third planetary gear mechanism $P_3$; the second planetary gear mechanism $P_2$ is disposed radially outside the first planetary gear mechanism $P_1$, and the third planetary gear mechanism $P_3$ is disposed radially outside the second planetary gear mechanism $P_2$.

The first planetary gear mechanism $P_1$ includes a first sun gear $ZS_1$, a first ring gear $ZR_1$, a plurality of first planetary gears $ZP_1$, and a first carrier $C_1$. The first sun gear $ZS_1$ is connected to a shaft end of the input shaft Si via an electromagnetic clutch 54. The first ring gear $ZR_1$ is formed integrally with the inner periphery of an inside ring member 55i disposed so as to surround the axis L. The first carrier $C_1$, which rotatably supports the first planetary gears $ZP_1$ meshing simultaneously with the first sun gear $ZS_1$ and the first ring gear $ZR_1$, is provided as a portion close to the center of the support plate 44. The first planetary gear mechanism $P_1$ is therefore of a star type in which the first ring gear $ZR_1$ is rotatable and the first carrier $C_1$ is fixed, and when the first sun gear $ZS_1$, which is connected to the input shaft Si via the electromagnetic clutch 54, rotates, the rotation is reduced in speed and reversed, and output to the first ring gear $ZR_1$.

The reduction ratio of the star type first-planetary gear mechanism $P_1$ is defined as $nr_1/ns_1$, where $ns_1$ is an input rotational speed of the first sun gear $ZS_1$ and $nr_1$ is an output rotational speed of the first ring gear $ZR_1$. If $zs_1$, $zr_1$, and $zp_1$ denote the number of teeth of the first sun gear $ZS_1$, the first ring gear $ZR_1$, and the first planetary gear $ZP_1$ respectively, the reduction ratio $nr_1/ns_1$ is given by $$nr_1/ns_1 = -zs_1/zr_1. \tag{6}$$

The minus sign of the right side of Equation (6) indicates that the direction of rotation of the first ring gear $ZR_1$ is opposite to the direction of rotation of the first sun gear $ZS_1$.

The second planetary gear mechanism $P_2$ includes a second sun gear $ZS_2$, a second ring gear $ZR_2$, a plurality of second planetary gears $ZP_2$, and a second carrier $C_2$. The second sun gear $ZS_2$ is formed on the outer periphery of the inside ring member 55i. The second ring gear $ZR_2$ is formed integrally with the inner periphery of an outside ring member 55o disposed so as to surround the axis L. The second carrier $C_2$, which rotatably supports the second planetary gears $ZP_2$ meshing simultaneously with the second sun gear $ZS_2$ and the second ring gear $ZR_2$, is provided as a portion close to the outer periphery of the support plate 44. The second planetary gear mechanism $P_2$ is therefore of a star type in which the second ring gear $ZR_2$ is rotatable and the second carrier $C_2$ is fixed, and when the second sun gear $ZS_2$, which is integral with the first ring gear $ZR_1$, rotates, the rotation is reduced in speed and reversed, and output to the second ring gear $ZR_2$.

The reduction ratio of the star type second planetary gear mechanism $P_2$ is defined as $nr_2/ns_2$, where $ns_2$ is an input rotational speed of the second sun gear $ZS_2$ and $nr_2$ is an output rotational speed of the second ring gear $ZR_2$. If $zs_2$, $zr_2$, and $zp_2$ denote the number of teeth of the second sun gear $ZS_2$, the second ring gear $ZR_2$, and the second planetary gear $ZP_2$, respectively, the reduction ratio $nr_2/ns_2$ is given by $$nr_2/ns_2 = -zs_2/zr_2. \qquad (7)$$

The minus sign of the right-hand side of Equation (7) indicates that the direction of rotation of the second ring gear $ZR_2$ is opposite to the direction of rotation of the second sun gear $ZS_2$.

The third planetary gear mechanism $P_3$ includes a third sun gear $ZS_3$, a third ring gear $ZR_3$, a plurality of third planetary gears $ZP_3$, and a third carrier $C_3$. The third sun gear $ZS_3$ is formed integrally with the outer periphery of the outside ring member 55o. The third ring gear $ZR_3$ is formed integrally with the inner periphery of the support ring 42, which is fixed to the casing 41. The third carrier $C_3$, which rotatably supports the third planetary gears $ZP_3$ meshing simultaneously with the third sun gear $ZS_3$ and the third ring gear $ZR_3$, is rotatably supported on the inner periphery of the support ring 42 via a ball bearing 57. The third planetary gear mechanism $P_3$ is therefore of a planetary type in which the third ring gear $ZR_3$ is fixed and the third carrier $C_3$ is rotatable, and when the third sun gear $ZS_3$, which is an input member, rotates, the rotation is reduced in speed in the same direction and output to the output shaft So, which is integral with the third carrier $C_3$.

The reduction ratio of the planetary type third planetary gear mechanism $P_3$ is defined as $nc_3/ns_3$, where $ns_3$ denotes an input rotational speed of the third sun gear $ZS_3$ and $nc_3$ denotes an output rotational speed of the third carrier $C_3$. If $zs_3$, $zr_3$, and $zp_3$ denote the number of teeth of the third sun gear $ZS_3$, the third ring gear $ZR_3$, and the third planetary gear $ZP_3$ respectively, the reduction ratio $nc_3/ns_3$ is given by $$nc_3/ns_3 = zs_3/(zs_3+zr_3). \qquad (8)$$

Since the output rotational speed $nr_1$ of the first ring gear $ZR_1$, which is the output member of the first planetary gear mechanism $P_1$, is equal to the input rotational speed $ns_2$ of the second sun gear $ZS_2$, which is the input member of the second planetary gear mechanism $P_2$, and the output rotational speed $nr_2$ of the second ring gear $ZR_2$, which is the output member of the second planetary gear mechanism $P_2$, is equal to the input rotational speed $ns_3$ of the third sun gear $ZS_3$, which is the input member of the third planetary gear mechanism $P_3$, the product of the reduction ratio $nr_1/ns_1$ of the first planetary gear mechanism $P_1$ shown in Equation (6), the reduction ratio $nr_2/ns_2$ of the second planetary gear mechanism $P_2$ shown in Equation (7), and the reduction ratio $nc_3/ns_3$ of the third planetary gear mechanism $P_3$ shown in Equation (8) is given by the ratio $nc_3/ns_1$ of the rotational speed $nc_3$ of the third carrier $C_3$ of the third planetary gear mechanism $P_3$, the third carrier $C_3$ being the output member of the reduction gear 49, relative to the rotational speed $ns_1$ of the first sun gear $ZS_1$ of the first planetary gear mechanism $P_1$, the first sun gear $ZS_1$ being the input member of the reduction gear 49.

$$(nr_1/ns_1) \times (nr_2/ns_2) \times (nc_3/ns_3) = nc_3/ns_1 \qquad (9)$$

From Equation (6) to Equation (8), the reduction ratio $nc_3/ns_1$ of the reduction gear 49 is given by $$nc_3/ns_1 = (-zs_1/zr_1) \times (-zs_2/zr_2) \times \{zs_3/(zs_3+zr_3)\} \qquad (10)$$

and in the embodiment, since the number of teeth of each gear is set as follows:

| | | |
|---|---|---|
| $zs_1 = 18$ | $zp_1 = 27$ | $zr_1 = 72$ |
| $zs_2 = 96$ | $zp_2 = 24$ | $zr_2 = 144$ |
| $zs_3 = 168$ | $zp_3 = 24$ | $zr_3 = 216$, | the reduction ratio $nc_3/ns_1$ of the reduction gear 49 obtained by substituting these numbers of teeth in Equation (10) is 1/13.7. That is, when the input shaft Si of the reduction gear 49 rotates 13.7 times, the output shaft So rotates once in the same direction.

As hereinbefore described, since the reduction gear 49 is formed by connecting the first to the third planetary gear mechanisms $P_1$ to $P_3$, it is possible to increase the torque of the motor 48 while ensuring that there is a sufficient reduction ratio. Furthermore, since the second planetary gear mechanism $P_2$ is disposed so as to overlap the radially outer side of the first planetary gear mechanism $P_1$, and the third planetary gear mechanism $P_3$ is disposed so as to overlap the radially outer side of the second planetary gear mechanism $P_2$, it is possible to reduce the thickness in the axis L direction of the reduction gear 49 compared with a case in which the first to the third planetary gear mechanisms $P_1$ to $P_3$ are all disposed so as to be stacked in the axis L direction. That is, the first electric actuators 12 and the second electric actuators 13 can be made compact by suppressing the thickness of the reduction gear 49 to a thickness corresponding to one planetary gear mechanism while ensuring that there is a reduction ratio corresponding to three planetary gear mechanisms, thereby enabling fitting under a user's clothing with a good appearance.

Figure 11:
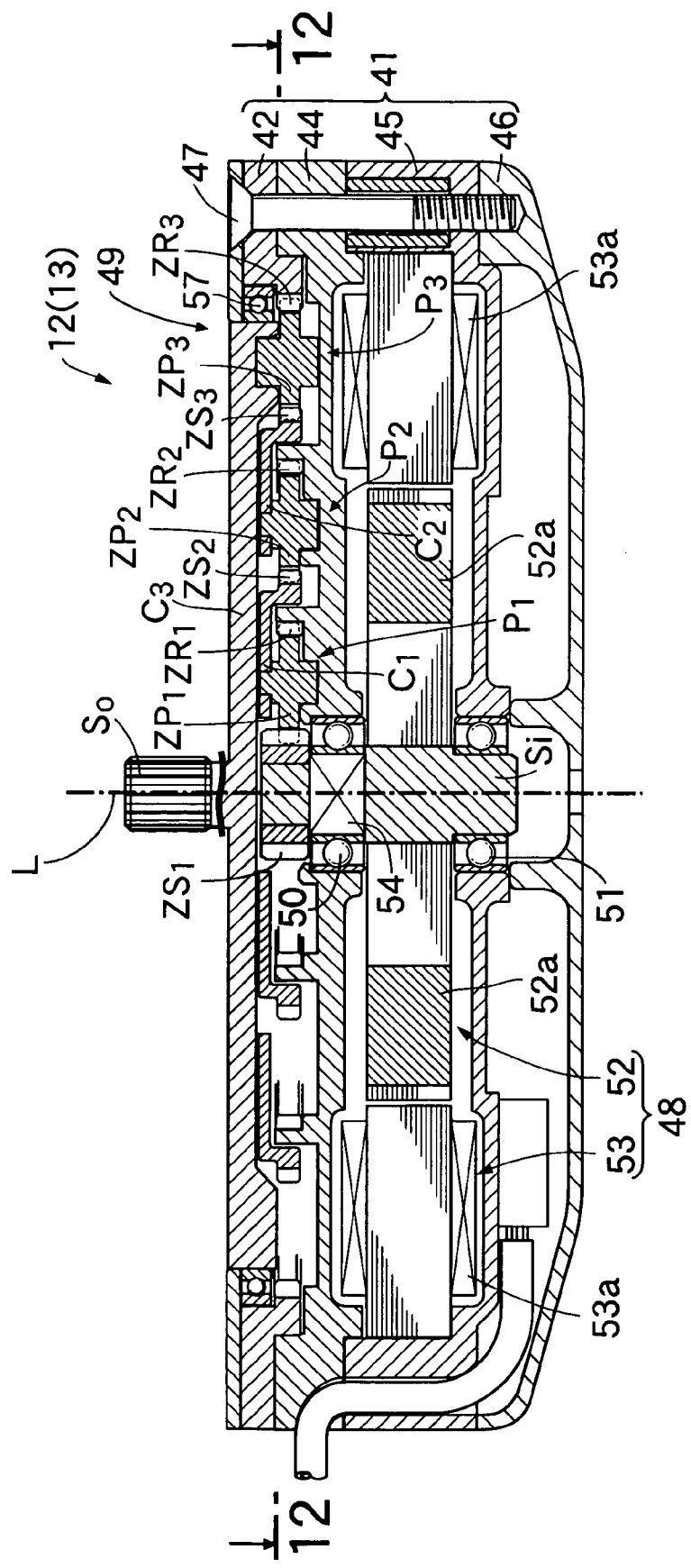
FIG. 11 to FIG. 13 show a third embodiment of the present invention.
Figure 12:
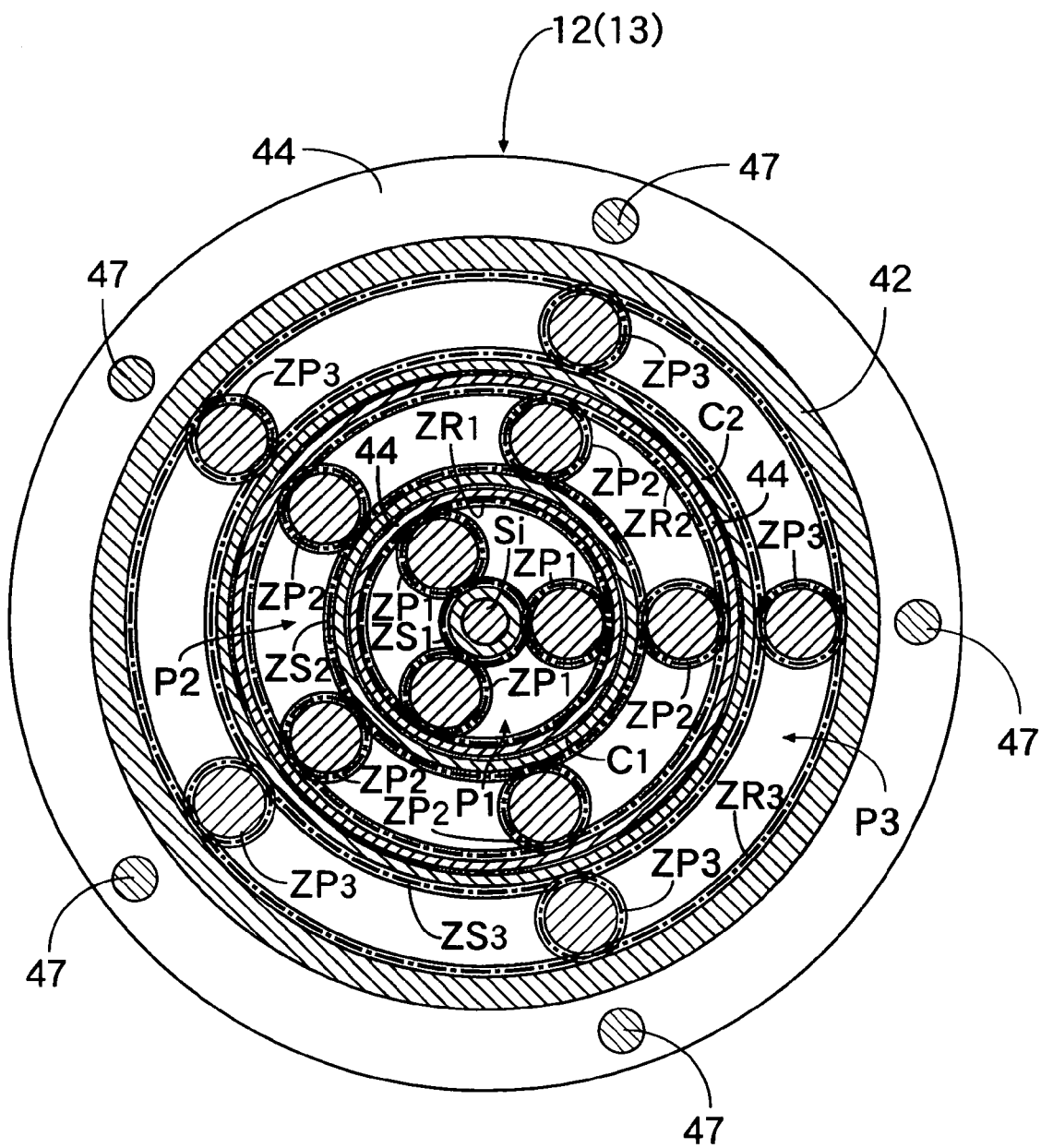
Figure 13:
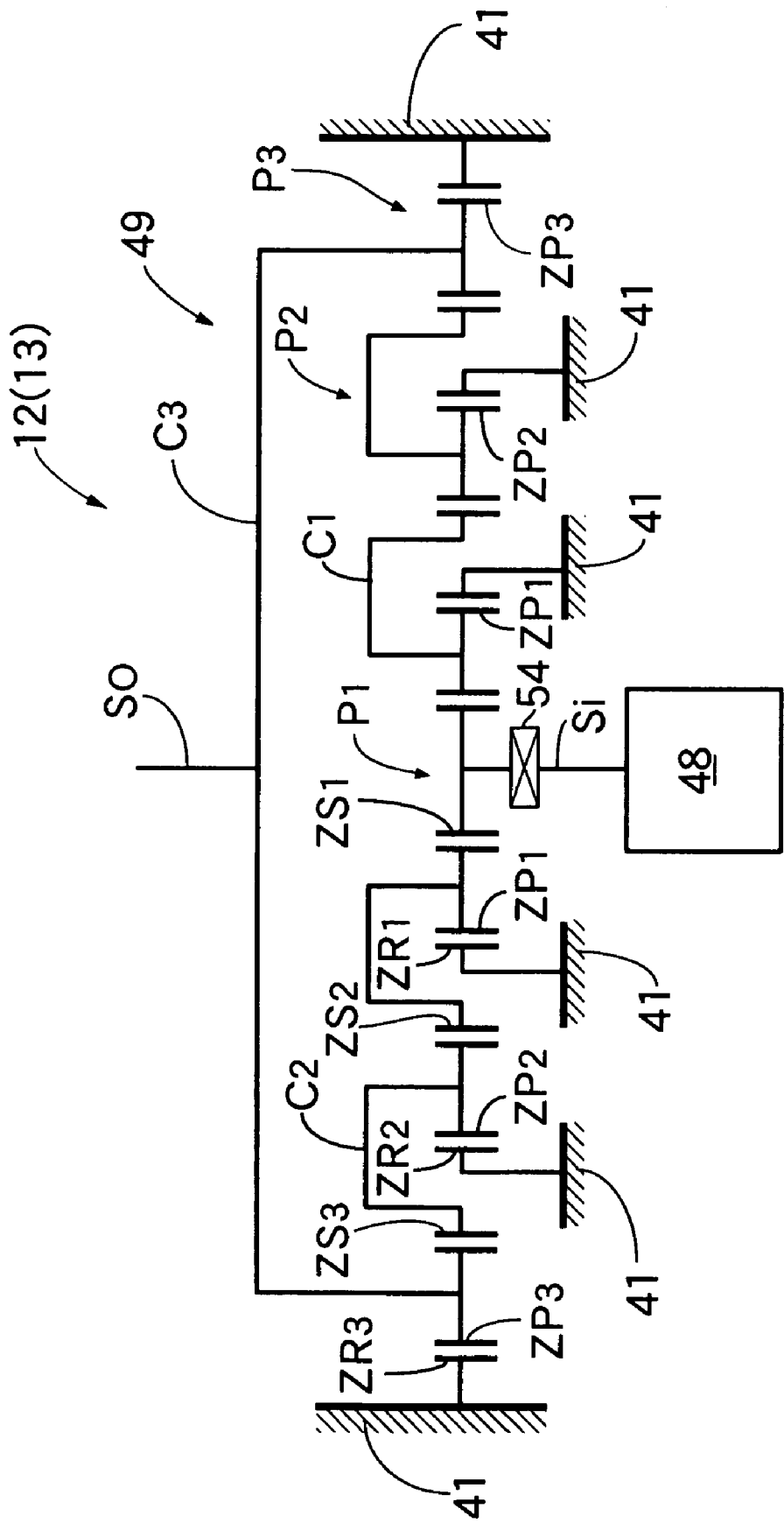
Figure 14:
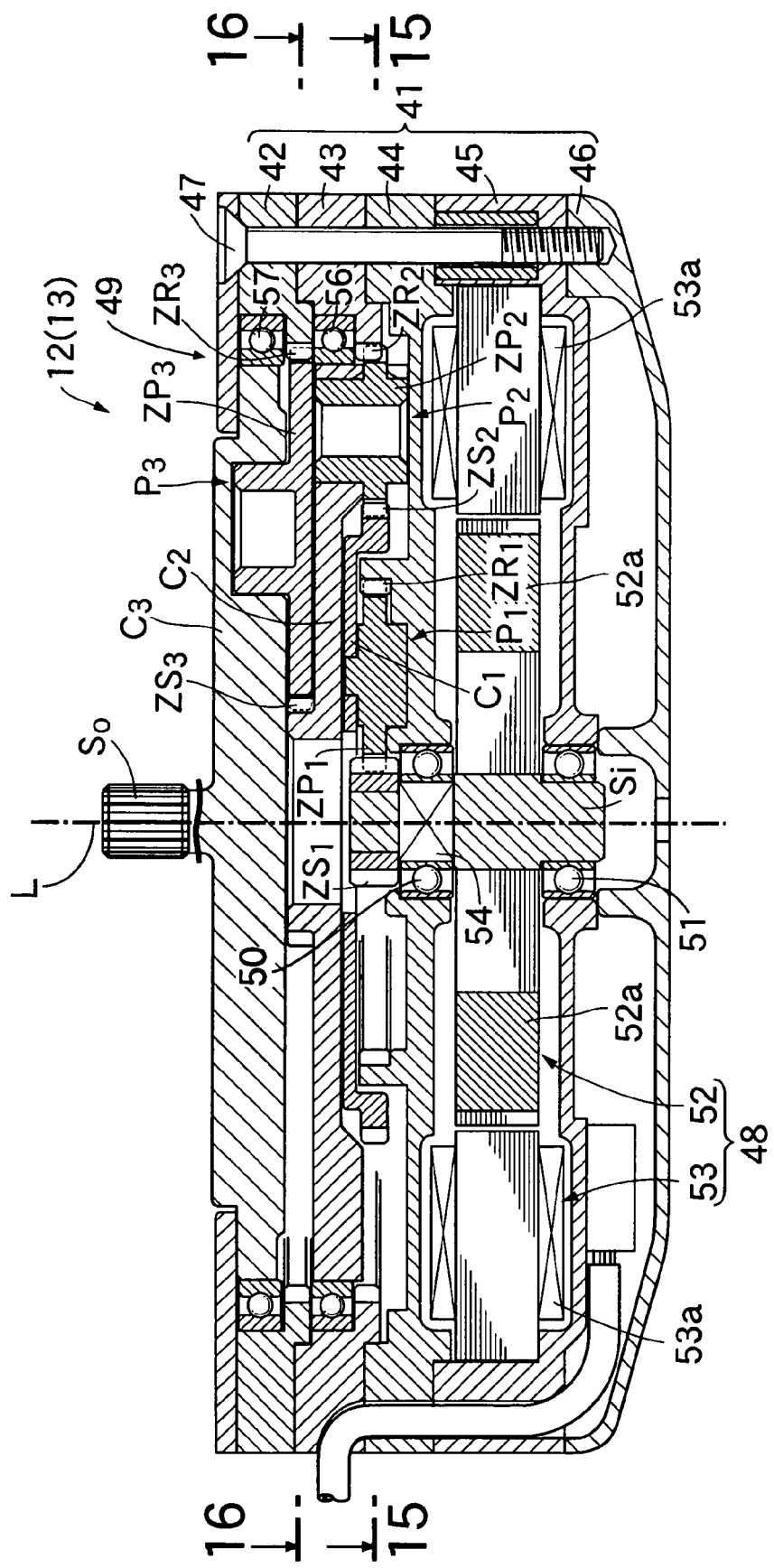
FIG. 14 to FIG. 17 show a fourth embodiment of the present invention.
Figure 15:
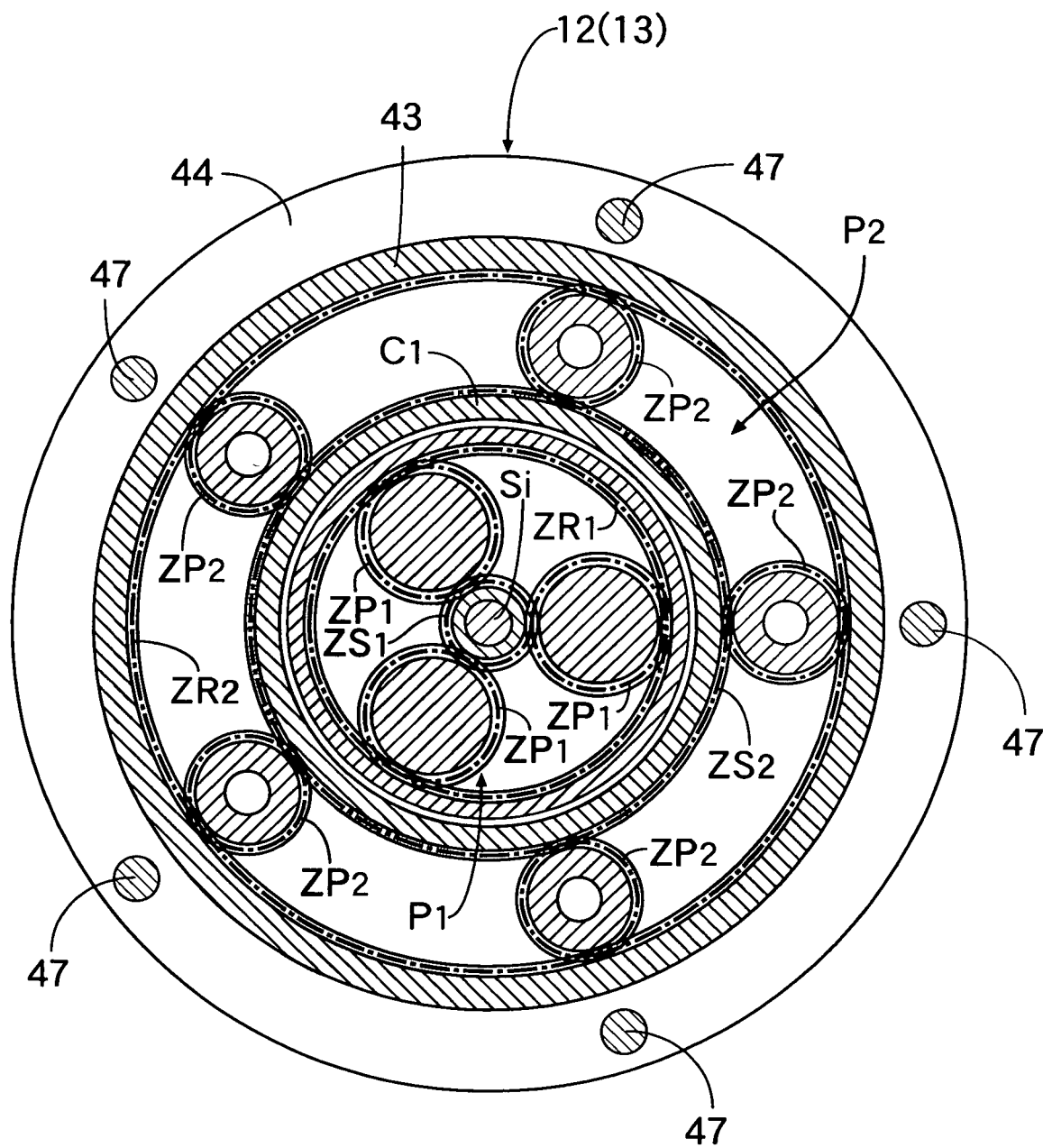
Figure 16:
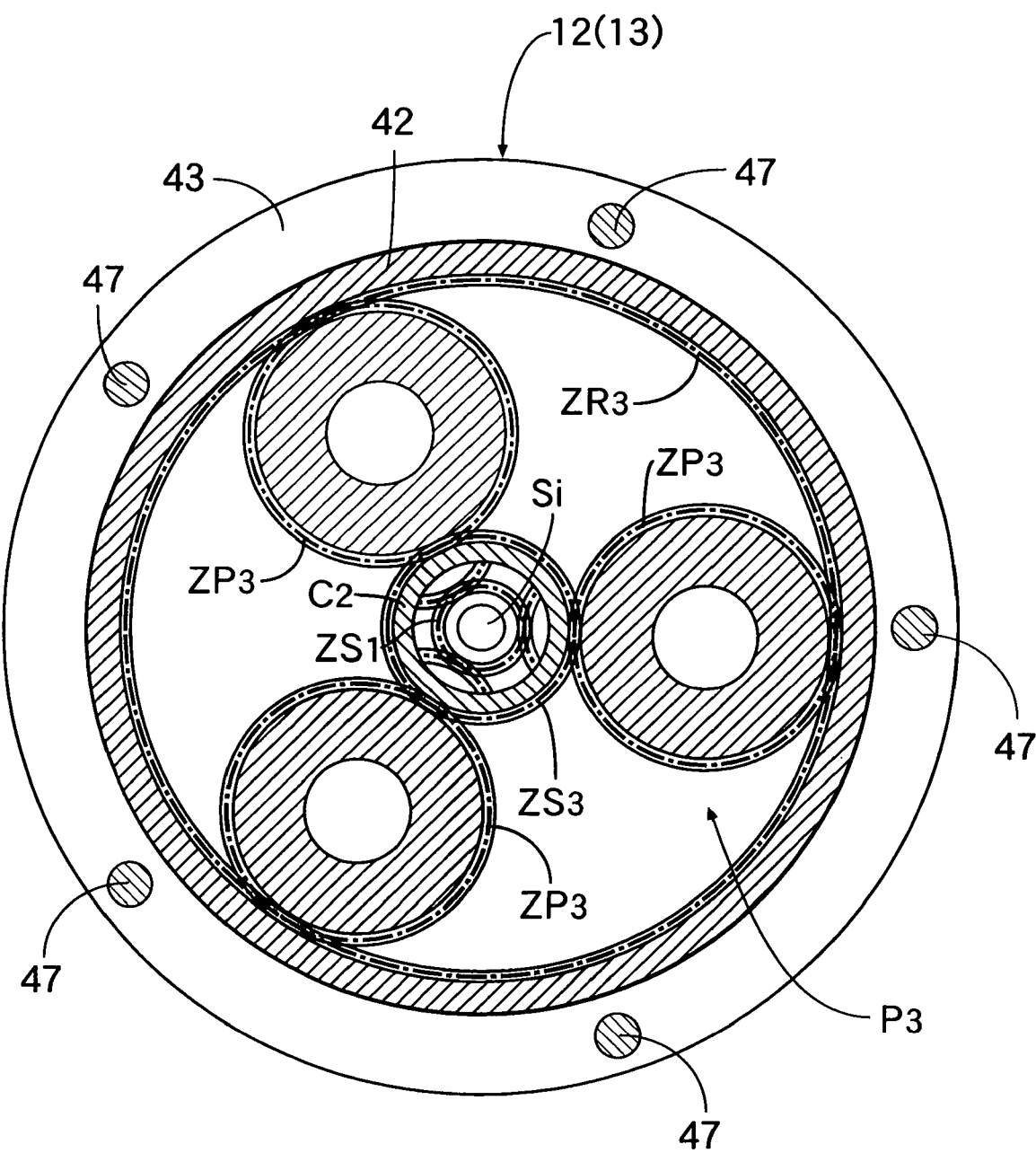
Figure 17:
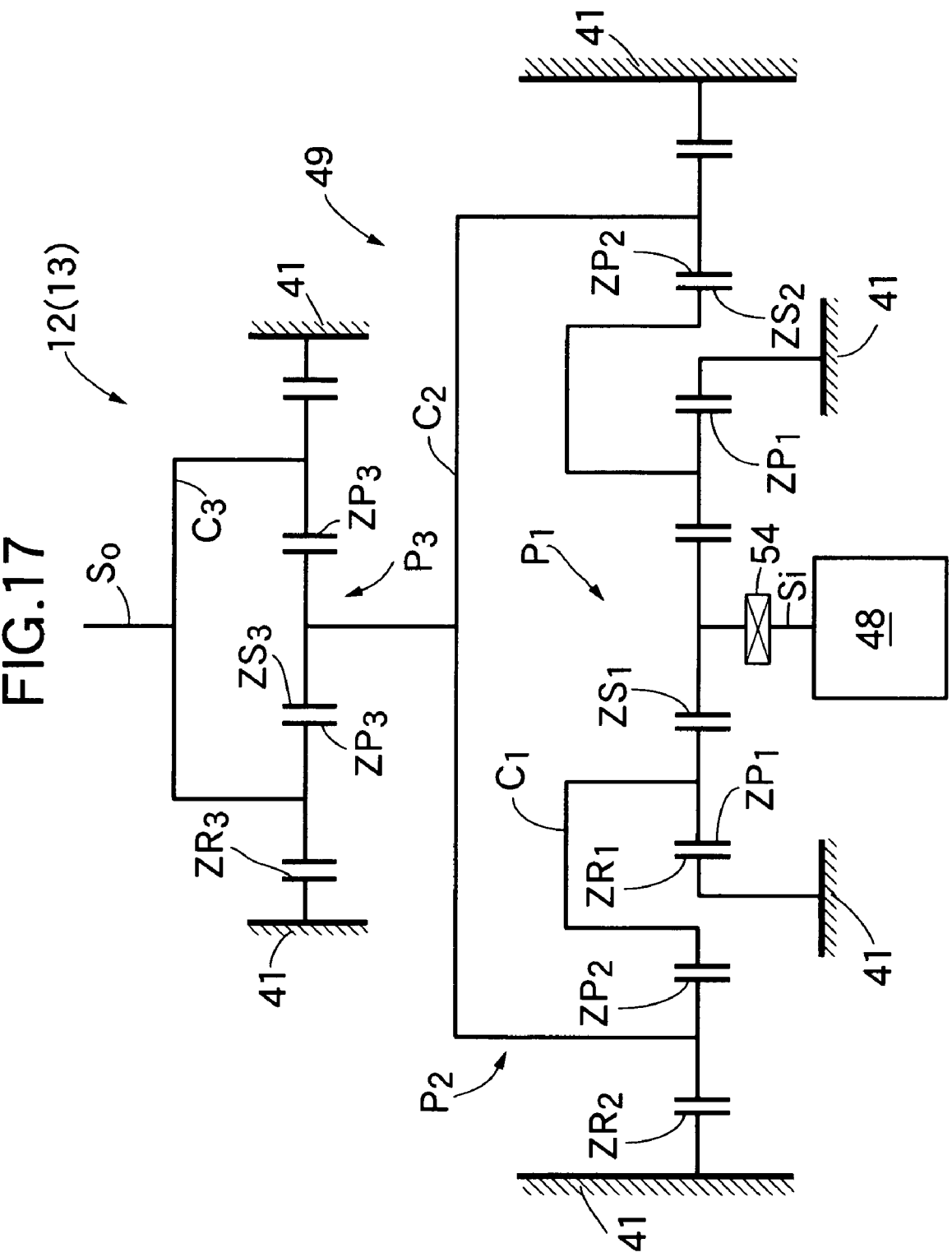

The structure of a first electric actuator 12 related to a third embodiment of the present invention is now explained with reference to FIG. 11 to FIG. 13. The structure of a second electric actuator 13 is the same as that of the first -electric actuator 12.

A casing 41 of the first electric actuator 12 is formed in a bottomed cylindrical shape having an axis L as the center. The casing 41 is formed by layering a support ring 42, a support plate 44, a motor housing 45, and a motor cover 46 and integrally securing them with a plurality of bolts 47. A motor 48 is housed within the motor housing 45 and the motor cover 46, and a reduction gear 49 is housed within the support ring 42 and the support plate 44. An input shaft Si of the reduction gear 49 is supported on the support plate 44 and the motor cover 46 via ball bearings 50 and 51, a rotor 52 of the motor 48 is fixed to the input shaft Si, and a stator 53 surrounding the outer periphery of the rotor 52 is fixed to the motor housing 45. A permanent magnet 52a and a coil 53a are provided on the rotor 52 and the stator 53 respectively, and when the coil 53a is energized, the input shaft Si rotates together with the rotor 52.

The reduction gear 49, which is housed within the support ring 42, includes a first planetary gear mechanism $P_1$, a second planetary gear mechanism $P_2$, and a third planetary gear mechanism $P_3$; the second planetary gear mechanism $P_2$ is disposed radially outside the first planetary gear mechanism $P_1$, and the third planetary gear mechanism $P_3$ is disposed radially outside the second planetary gear mechanism $P_2$.

The first planetary gear mechanism $P_1$ includes a first sun gear $ZS_1$, a first ring gear $ZR_1$, a plurality of first planetary gears $ZP_1$, and a first carrier $C_1$. The first sun gear $ZS_1$ is connected to a shaft end of the input shaft Si via an electromagnetic clutch 54. The first ring gear $ZR_1$ is formed integrally at a position close to the center of the support plate 44 so as to surround the axis L. The first carrier $C_1$, which rotatably supports the first planetary gears $ZP_1$ meshing simultaneously with the first sun gear $ZS_1$ and the first ring gear $ZR_1$, is disposed rotatably around the axis L. The first planetary gear mechanism $P_1$ is therefore of a planetary type in which the first ring gear $ZR_1$ is fixed and the first carrier $C_1$ is rotatable, and when the first sun gear $ZS_1$, which is connected to the input shaft Si via the electromagnetic clutch 54, rotates, the rotation is reduced in speed in the same direction, and output to the first carrier $C_1$.

The reduction ratio of the planetary type first planetary gear mechanism $P_1$ is defined as $nc_1/ns_1$, where $ns_1$ is an input rotational speed of the first sun gear $ZS_1$ and $nc_1$ is an output rotational speed of the first carrier $C_1$. If $zs_1$, $zr_1$, and $zp_1$ denote the number of teeth of the first sun gear $ZS_1$, the first ring gear $ZR_1$, and the first planetary gear $ZP_1$ respectively, the reduction ratio $nc_1/ns_1$ is given by $$nc_1/ns_1 = zs_1/(zs_1+zr_1). \tag{11}$$

The second planetary gear mechanism $P_2$ includes a second sun gear $ZS_2$, a second ring gear $ZR_2$, a plurality of second planetary gears $ZP_2$, and a second carrier $C_2$. The second sun gear $ZS_2$ is formed on the outer periphery of the first carrier $C_1$ of the first planetary gear mechanism $P_1$. The second ring gear $ZR_2$ is formed at a position close to the outer periphery of the support plate 44 so as to surround the axis L. The second carrier $C_2$, which rotatably supports the second planetary gears $ZP_2$ meshing simultaneously with the second sun gear $ZS_2$ and the second ring gear $ZR_2$, is disposed rotatably around the axis L. The second planetary gear mechanism $P_2$ is therefore of a planetary type in which the second ring gear $ZR_2$ is fixed and the second carrier $C_2$ is rotatable, and when the second sun gear $ZS_2$ rotates, the rotation is reduced in speed in the same direction, and output to the second carrier $C_2$.

The reduction ratio of the planetary type second planetary gear mechanism $P_2$ is defined as $nc_2/ns_2$, where $ns_2$ is an input rotational speed of the second sun gear ZS and $nc_2$ is an output rotational speed of the second carrier $C_2$. If $zs_2$, $zr_2$, and $zp_2$ denote the number of teeth of the second sun gear $ZS_2$, the second ring gear $ZR_2$, and the second planetary gear $ZP_2$ respectively, the reduction ratio $nc_2/ns_2$ is given by $$nc_2/ns_2 = zs_2/(zs_2+zr_2). \tag{12}$$

The third planetary gear mechanism $P_3$ includes a third sun gear $ZS_3$, a third ring gear $ZR_3$, a plurality of third planetary gears $ZP_3$, and a third carrier $C_3$. The third sun gear $ZS_3$ is formed on the outer periphery of the second carrier $C_2$ of the second planetary gear mechanism $P_2$. The third ring gear $ZR_3$ is formed integrally with the inner periphery of the support ring 42. The third carrier $C_3$, which rotatably supports the third planetary gears $ZP_3$ meshing simultaneously with the third sun gear $ZS_3$ and the third ring gear $ZR_3$, is rotatably supported on the inner periphery of the support ring 42 via a ball bearing 57. The third planetary gear mechanism $P_3$ is therefore of a planetary type in which the third ring gear $ZR_3$ is fixed and the third carrier $C_3$ is rotatable, and when the third sun gear $ZS_3$ rotates, the rotation is reduced in speed in the same direction and output to the output shaft So, which is integral with the third carrier $C_3$.

The reduction ratio of the planetary type third planetary gear mechanism $P_3$ is defined as $nc_3/ns_3$, where $ns_3$ denotes an input rotational speed of the third sun gear $ZS_3$ and $nc_3$ denotes an output rotational speed of the third carrier $C_3$. If $zs_3$, $zr_3$, and $zp_3$ denote the number of teeth of the third sun gear $ZS_3$, the third ring gear $ZR_3$, and the third planetary gear $ZP_3$ respectively, the reduction ratio $nc_3/ns_3$ is given by $$nc_3/ns_3 = zs_3/(zs_3+zr_3). \tag{13}$$

Since the output rotational speed $nc_1$ of the first carrier $C_1$, which is the output member of the first planetary gear mechanism $P_1$, is equal to the input rotational speed $ns_2$ of the second sun gear $ZS_2$, which is the input member of the second planetary gear mechanism $P_2$, and the output rotational speed $nc_2$ of the second carrier $C_2$, which is the output member of the second planetary gear mechanism $P_2$, is equal to the input rotational speed $ns_3$ of the third sun gear $ZS_3$, which is the input member of the third planetary gear mechanism $P_3$, the product of the reduction ratio $nc_1/ns_1$ of the first planetary gear mechanism $P_1$ shown in Equation (11), the reduction ratio $nc_2/ns_2$ of the second planetary gear mechanism $P_2$ shown in Equation (12), and the reduction ratio $nc_3/ns_3$ of the third planetary gear mechanism $P_3$ shown in Equation (13) is given by the ratio $nc_3/ns_1$ of the rotational speed $nc_3$ of the third carrier $C_3$ of the third planetary gear mechanism $P_3$, the third carrier $C_3$ being the output member of the reduction gear 49, relative to the rotational speed $ns_1$ of the first sun gear $ZS_1$ of the first planetary gear mechanism $P_1$, the first sun gear $ZS_1$ being the input member of the reduction gear 49.

$$(nc_1/ns_1) \times (nc_2/ns_2) \times (nc_3/ns_3) = nc_3/ns_1 \tag{14}$$

From Equation (11) to Equation (13), the reduction ratio $nc_3/ns_1$ of the reduction gear 49 is given by $$nc_3/ns_1 = \{zs_1/(zs_1+zr_1)\} \times \{zs_2/(zs_2+zr_2)\} \times \{zs_3/(zs_3+zr_3)\} \tag{15}$$

and in the embodiment, since the number of teeth of each gear is set as follows:

| | | |
|---|---|---|
| $zs_1 = 18$ | $zp_1 = 27$ | $zr_1 = 72$ |
| $zs_2 = 96$ | $zp_2 = 24$ | $zr_2 = 144$ |
| $zs_3 = 168$ | $zp_3 = 24$ | $zr_3 = 216$, | the reduction ratio $nc_3/ns_1$ of the reduction gear 49 obtained by substituting these numbers of teeth in Equation (15) is 1/28.5. That is, when the input shaft Si of the reduction gear 49 rotates 28.5 times, the output shaft So rotates once in the same direction.

As hereinbefore described, since the reduction gear 49 is formed by connecting the first to the third planetary gear mechanisms $P_1$ to $P_3$, it is possible to increase the torque of the motor 48 while ensuring that there is a sufficient reduction ratio. Furthermore, since the second planetary gear mechanism $P_2$ is disposed so as to overlap the radially outer side of the first planetary gear mechanism $P_1$, and the third planetary gear mechanism $P_3$ is disposed so as to overlap the radially outer side of the second planetary gear mechanism $P_2$, it is possible to reduce the thickness in the axis L direction of the reduction gear 49 compared with a case in which the first to the third lo planetary gear mechanisms $P_1$ to $P_3$ are all disposed so as to be stacked in the axis L direction. That is, the first electric actuators 12 and the second electric actuators 13 can be made compact by suppressing the thickness of the reduction gear 49 to a thickness corresponding to one planetary gear mechanism while ensuring that there is a reduction ratio corresponding to three planetary gear mechanisms, thereby enabling fitting under a user's clothing with a good appearance.

The structure of a first electric actuator 12 related to a fourth embodiment of the present invention is now explained with reference to FIG. 14 to FIG. 17. The structure of a second electric actuator 13 is the same as that of the first electric actuator 12.

A casing 41 of the first electric actuator 12 is formed in a bottomed cylindrical shape having an axis L as the center. The casing 41 is formed by layering a first support ring 42, a second support ring 43, a support plate 44, a motor housing 45, and a motor cover 46 and integrally securing them with a plurality of bolts 47. A motor 48 is housed within the motor housing 45 and the motor cover 46, and a reduction gear 49 is housed within the first support ring 42 and the second support ring 43. An input shaft Si of the reduction gear 49 is supported on the support plate 44 and the motor housing 45 via ball bearings 50 and 51, a rotor 52 of the motor 48 is fixed to the input shaft Si, and a stator 53 surrounding the outer periphery of the rotor 52 is fixed to the motor housing 45. A permanent magnet 52a and a coil 53a are provided on the rotor 52 and the stator 53 respectively, and when the coil 53a is energized, the input shaft Si rotates together with the rotor 52.

The reduction gear 49 includes a first planetary gear mechanism $P_1$ and a second planetary gear mechanism $P_2$ housed inside the second support ring 43, and a third planetary gear mechanism $P_3$ housed inside the first support ring 42. The first planetary gear mechanism $P_1$ is disposed radially inside the second planetary gear mechanism $P_2$, and the third planetary gear mechanism $P_3$ is disposed outside, in the axis L direction, the first and second planetary gear mechanisms $P_1$ and $P_2$.

The first planetary gear mechanism $P_1$ includes a first sun gear $ZS_1$, a first ring gear $ZR_1$, a plurality of first planetary gears $ZP_1$, and a first carrier $C_1$. The first sun gear $ZS_1$ is connected to a shaft end of the input shaft Si via an electromagnetic clutch 54. The first ring gear $ZR_1$ is formed integrally with the support plate 44 so as to surround the axis L. The first carrier $C_1$, which rotatably supports the first planetary gears $ZP_1$ meshing simultaneously with the first sun gear $ZS_1$ and the first ring gear $ZR_1$, is disposed rotatably around the axis L. The first planetary gear mechanism $P_1$ is therefore of a planetary type in which the first ring gear $ZR_1$ is fixed and the first carrier $C_1$ is rotatable, and when the first sun gear $ZS_1$, which is connected to the input shaft Si via the electromagnetic clutch 54, rotates, the rotation is reduced in speed in the same direction, and output to the first carrier $C_1$.

The reduction ratio of the planetary type first planetary gear mechanism $P_1$ is defined as $nc_1/ns_1$, where $ns_1$ is an input rotational speed of the first sun gear $ZS_1$ and $nc_1$ is an output rotational speed of the first carrier $C_1$. If $zs_1$, $zr_1$, and $zp_1$ denote the numbers of teeth of the first sun gear $ZS_1$, the first ring gear $ZR_1$, and the first planetary gear $ZP_1$ respectively, the reduction ratio $nc_1/ns_1$ is given by $$nc_1/ns_1 = zs_1/(zs_1 + zr_1). \tag{16}$$

The second planetary gear mechanism $P_2$ includes a second sun gear $ZS_2$, a second ring gear $ZR_2$, a plurality of second planetary gears $ZP_2$, and a second carrier $C_2$. The second sun gear $ZS_2$ is formed on the outer periphery of the first carrier $C_1$ of the first planetary gear mechanism $P_1$. The second ring gear $ZR_2$ is formed integrally with the inner periphery of the second support ring 43, which is fixed to the casing 41. The second carrier $C_2$, which rotatably supports the second planetary gears $ZP_2$ meshing simultaneously with the second sun gear $ZS_2$ and the second ring gear $ZR_2$, is rotatably supported on the inner periphery of the second support ring 43 via a ball bearing 56. The second planetary gear mechanism $P_2$ is therefore of a planetary type in which the second ring gear $ZR_2$ is fixed and the second carrier $C_2$ is rotatable, and when the second sun gear $ZS_2$, which is an input member, rotates, the rotation is reduced in speed in the same direction, and output to the second carrier $C_2$.

The reduction ratio of the planetary type second planetary gear mechanism $P_2$ is defined as $nc_2/ns_2$, where $ns_2$ is an input rotational speed of the second sun gear $ZS_2$ and $nc_2$ is an output rotational speed of the second carrier $C_2$. If $zs_2$, $zr_2$, and $zp_2$ denote the number of teeth of the second sun gear $ZS_2$, the second ring gear $ZR_2$, and the second planetary gear $ZP_2$ respectively, the reduction ratio $nc_2/ns_2$ is given by $$nc_2/ns_2 = zs_2/(zs_2 + zr_2). \tag{17}$$

The third planetary gear mechanism $P_3$ includes a third sun gear $ZS_3$, a third ring gear $ZR_3$, a plurality of third planetary gears $ZP_3$, and a third carrier $C_3$. The third sun gear $ZS_3$ is formed integrally with the outer periphery of a central part of the second carrier $C_2$ of the second planetary gear mechanism $P_2$. The third ring gear $ZR_3$ is formed integrally with the inner periphery of the first support ring 42, which is fixed to the casing 41. The third carrier $C_3$, which rotatably supports the third planetary gears $ZP_3$ meshing simultaneously with the third sun gear $ZS_3$ and the third ring gear $ZR_3$, is rotatably supported on the inner periphery of the first support ring 42 via a ball bearing 57. The third planetary gear mechanism $P_3$ is therefore of a planetary type in which the third ring gear $ZR_3$ is fixed and the third carrier $C_3$ is rotatable, and when the third sun gear $ZS_3$, which is an input member, rotates, the rotation is reduced in speed in the same direction and output to the output shaft So, which is integral with the third carrier $C_3$.

The reduction ratio of the planetary type third planetary gear mechanism $P_3$ is defined as $nc_3/ns_3$, where $ns_3$ denotes an input rotational speed of the third sun gear $ZS_3$ and $nc_3$ denotes an output rotational speed of the third carrier $C_3$. If $zs_3$, $zr_3$, and $zp_3$ denote the number of teeth of the third sun gear $ZS_3$, the third ring gear $ZR_3$, and the third planetary gear $ZP_3$ respectively, the reduction ratio $nc_3/ns_3$ is given by $$nc_3/ns_3 = zs_3/(zs_3 + zr_3). \tag{18}$$

Since the output rotational speed $nc_1$ of the first carrier $C_1$, which is the output member of the first planetary gear mechanism $P_1$, is equal to the input rotational speed $ns_2$ of the second sun gear $ZS_2$, which is the input member of the second planetary gear mechanism $P_2$, and the output rotational speed $nc_2$ of the second carrier $C_2$, which is the output member of the second planetary gear mechanism $P_2$, is equal to the input rotational speed $ns_3$ of the third sun gear $ZS_3$, which is the input member of the third planetary gear mechanism $P_3$, the product of the reduction ratio $nc_1/ns_1$ of the first planetary gear mechanism $P_1$ shown in Equation (16), the reduction ratio $nc_2/ns_2$ of the second planetary gear mechanism $P_2$ shown in Equation (17), and the reduction ratio $nc_3/ns_3$ of the third planetary gear mechanism $P_3$ shown in Equation (18) is given by the ratio $nc_3/ns_1$ of the rotational speed $nc_3$ of the third carrier $C_3$ of the third planetary gear mechanism $P_3$, the third carrier $C_3$ being the output member of the reduction gear 49, relative to the rotational speed $ns_1$ of the first sun gear $ZS_1$ of the first planetary gear mechanism $P_1$, the first sun gear $ZS_1$ being the input member of the reduction gear 49.

$$(nc_1/ns_1) \times (nc_2/ns_2) \times (nc_3/ns_3) = nc_3/ns_1 \quad (19)$$

From Equation (16) to Equation (18), the reduction ratio $nc_3/ns_1$ of the reduction gear 49 is given by $$nc_3/ns_1 = \{zs_1/(zs_1+zr_1)\} \times \{zs_2/(zs_2+zr_2)\} \times \{zs_3/(zs_3+zr_3)\} \quad (20)$$

and in the embodiment, since the number of teeth of each gear is set as follows:

| | | |
|---|---|---|
| $zs_1 = 18$ | $zp_1 = 27$ | $zr_1 = 72$ |
| $zs_2 = 96$ | $zp_2 = 24$ | $zr_2 = 144$ |
| $zs_3 = 36$ | $zp_3 = 54$ | $zr_3 = 144$, | the reduction ratio $nc_3/ns_1$ of the reduction gear 49 obtained by substituting these numbers of teeth in Equation (20) is 1/62.5. That is, when the input shaft Si of the reduction gear 49 rotates 62.5 times, the output shaft So rotates once in the same direction.

As hereinbefore described, since the reduction gear 49 is formed by connecting the first to the third planetary gear mechanisms $P_1$ to $P_3$, it is possible to increase the torque of the motor 48 while ensuring that there is a sufficient reduction ratio. Furthermore, since the second planetary gear mechanism $P_2$ is disposed so as to overlap the radially outer side of the first planetary gear mechanism $P_1$, it is possible to reduce the thickness in the axis L direction of the reduction gear 49 compared with a case in which the first to the third planetary gear mechanisms $P_1$ to $P_3$ are all disposed so as to be stacked in the axis L direction. That is, the first electric actuators 12 and the second electric actuators 13 can be made compact by suppressing the thickness of the reduction gear 49 to a thickness corresponding to two planetary gear mechanisms while ensuring that there is a reduction ratio corresponding to three planetary gear mechanisms, thereby enabling fitting lo under a user's clothing with a good appearance.

Although embodiments of the present invention are explained in detail above, the present invention can be modified in a variety of ways without departing from the spirit and scope thereof.

For example, the reduction gear 49 of the first embodiment includes the first to the third planetary gear mechanisms $P_1$ to $P_3$, but the third planetary gear mechanism $P_3$ may be omitted and only the first and second planetary gear mechanisms $P_1$ and $P_2$ may be employed.

Furthermore, in the first to the fourth embodiments, the electromagnetic clutch 54 is disposed between the input shaft Si and the first sun gear $ZS_1$, but the electromagnetic clutch 54 may be provided at any position between the input shaft Si and the output shaft So.

INDUSTRIAL APPLICABILITY

As hereinbefore described, the present invention can be suitably applied to a reduction gear for a walking assistance system assisting an injured person or an elderly person with weakened leg force to move.

The invention claimed is:

1. A reduction gear for a walking assistance system that, in order to assist walking movement by extending/bending a user's leg joint, reduces the speed of rotation of an input shaft (Si) driven by a motor (48) and transmits the rotation to an output shaft (So) connected to the leg joint, the reduction gear comprising:

the input shaft (Si), the output shaft (So), a first planetary gear mechanism ($P_1$), and a second planetary gear mechanism ($P_2$) disposed coaxially on an axis (L), the second planetary gear mechanism ($P_2$) being disposed so as to substantially overlap the radially outer side of the first planetary gear mechanism ($P_1$), the rotation of the input shaft (Si) being reduced in speed by the first planetary gear mechanism ($P_1$) and the second planetary gear mechanism ($P_2$) and transmitted to the output shaft (So);

the first planetary gear mechanism ($P_1$) comprising a first sun gear ($ZS_1$) provided on the input shaft (Si), a first ring gear ($ZR_1$) rotatably disposed so as to surround the outer periphery of the first sun gear ($ZS_1$), a plurality of first planetary gears ($ZP_1$) meshing simultaneously with the first sun gear ($ZS_1$) and the first ring gear ($ZR_1$), and a first carrier ($C_1$) rotatably supporting the first planetary gears ($ZP_1$), and;

the second planetary gear mechanism ($P_2$) comprising a second sun gear ($ZS_2$) provided on the outer periphery of the first ring gear ($ZR_1$), a second ring gear ($ZR_2$) disposed so as to surround the outer periphery of the second sun gear ($ZS_2$), a plurality of second planetary gears ($ZP_2$) meshing simultaneously with the second sun gear ($ZS_2$) and the second ring gear ($ZR_2$), and a second carrier ($C_2$) rotatably supporting the second planetary gears ($ZP_2$), wherein the first carrier ($C_1$) of the first planetary gear mechanism ($P_1$) is fixed to a casing (41), the second ring gear ($ZR_2$) of the second planetary gear mechanism ($P_2$) is fixed to the casing (41), and the second carrier ($C_2$) of the second planetary gear mechanism ($P_2$) is connected to the output shaft (So).

2. The reduction gear for the walking assistance system according to claim 1, wherein a third planetary gear mechanism ($P_3$) is disposed so as to be coaxial with and be stacked on the first planetary gear mechanism ($P_1$) and the second planetary gear mechanism ($P_2$) in the axis (L) direction, the third planetary gear mechanism ($P_3$) comprising a third sun gear ($ZS_3$) provided on the outer periphery of a central part of the second carrier ($C_2$) of the second planetary gear mechanism ($P_2$), a third ring gear ($ZR_3$) fixed to the casing and disposed so as to surround the outer periphery of the third sun gear ($ZS_3$), a plurality of third planetary gears ($ZP_3$) meshing simultaneously with the third sun gear ($ZS_3$) and the third ring gear ($ZR_3$), and a third carrier ($C_3$) rotatably supporting the third planetary gear ($ZP_3$) and connected to the output shaft (So).

3. A reduction gear for a walking assistance system that, in order to assist walking movement by extending/bending a user's leg joint, reduces the speed of rotation of an input shaft (Si) driven by a motor (48) and transmits the rotation to an output shaft (So) connected to the leg joint, the reduction gear comprising:

the input shaft (Si), the output shaft (So), a first planetary gear mechanism ($P_1$), and a second planetary gear mechanism ($P_2$) disposed coaxially on an axis (L), the second planetary gear mechanism ($P_2$) being disposed so as to substantially overlap the radially outer side of the first planetary gear mechanism ($P_1$), the rotation of the input shaft (Si) being reduced in speed by the first planetary gear mechanism ($P_1$) and the second planetary gear mechanism ($P_2$) and transmitted to the output shaft (So);

the first planetary gear mechanism ($P_1$) comprising a first sun gear ($ZS_1$) provided on the input shaft (Si), a first ring gear ($ZR_1$) rotatably disposed so as to surround the outer periphery of the first sun gear ($ZS_1$), a plurality of first planetary gears ($ZP_1$) meshing simultaneously with the first sun gear ($ZS_1$) and the first ring gear ($ZR_1$), and a first carrier ($C_1$) rotatably supporting the first planetary gears ($ZP_1$), and;

the second planetary gear mechanism ($P_2$) comprising a second sun gear ($ZS_2$) provided on the outer periphery of the first ring gear ($ZR_1$), a second ring gear ($ZR_2$) disposed so as to surround the outer periphery of the second sun gear ($ZS_2$), a plurality of second planetary gears ($ZP_2$) meshing simultaneously with the second sun gear ($ZS_2$) and the second ring gear ($ZR_2$), and a second carrier ($C_2$) rotatably supporting the second planetary gears ($ZP_2$), wherein the first planetary gear mechanism ($P_1$) is sandwiched between the first carrier ($C_1$) and the second carrier ($C_2$).

4. The reduction gear for the walking assistance system according to claim 3, wherein the first carrier ($C_1$) of the first planetary gear mechanism ($P_1$) is fixed to a casing (41), the second ring gear ($ZR_2$) of the second planetary gear mechanism ($P_2$) is fixed to the casing (41), and the second carrier ($C_2$) of the second planetary gear mechanism ($P_2$) is connected to the output shaft (So).

5. The reduction gear for the walking assistance system according to claim 4, wherein a third planetary gear mechanism ($P_3$) is disposed so as to be coaxial with and be stacked on the first planetary gear mechanism ($P_1$) and the second planetary gear mechanism ($P_2$) in the axis (L) direction, the third planetary gear mechanism ($P_3$) comprising a third sun gear ($ZS_3$) provided on the outer periphery of a central part of the second carrier ($C_2$) of the second planetary gear mechanism ($P_2$), a third ring gear ($ZR_3$) fixed to the casing and disposed so as to surround the outer periphery of the third sun gear ($ZS_3$), a plurality of third planetary gears ($ZP_3$) meshing simultaneously with the third sun gear ($ZS_3$) and the third ring gear ($ZR_3$), and a third carrier ($C_3$) rotatably supporting the third planetary gear ($ZP_3$) and connected to the output shaft (So).

6. The reduction gear for the walking assistance system according to claim 3, wherein the first carrier ($C_1$) is part of a casing of the reduction gear.

7. The reduction gear for the walking assistance system according to claim 3, wherein the first carrier ($C_1$) is non-rotatable.

8. The reduction gear for the walking assistance system according to claim 3, wherein the first carrier ($C_1$) has a diameter larger than a diameter of the second carrier ($C_2$).

9. The reduction gear for the walking assistance system according to claim 5, wherein the first carrier ($C_1$) has a diameter larger than a diameter of the third carrier ($C_3$).

10. The reduction gear for the walking assistance system according to claim 5, wherein a quantity of first planetary gears ($ZP_1$) is greater than a quantity of second planetary gears ($ZP_2$).

11. The reduction gear for the walking assistance system according to claim 3, enclosed in a casing that is substantially cylindrical in shape, wherein the casing is formed by layering a first support ring, a second support ring, a support plate, a motor housing, and a motor cover and integrally securing them with a plurality of bolts.

12. A reduction gear for a walking assistance system that, in order to assist walking movement by extending/bending a user's leg joint, reduces the speed of rotation of an input shaft (Si) driven by a motor (48) and transmits the rotation to an output shaft (So) connected to the leg joint, the reduction gear comprising: the input shaft (Si), the output shaft (So), a first planetary gear mechanism (Pl), and a second planetary gear mechanism (P2) disposed coaxially on an axis (L), the second planetary gear mechanism (P2) being disposed so as to substantially overlap the radially outer side of the first planetary gear mechanism (P1), the rotation of the input shaft (Si) being reduced in speed by the first planetary gear mechanism (P1) and the second planetary gear mechanism (P2) and transmitted to the output shaft (So); the first planetary gear mechanism (P1) comprising a first sun gear (ZS1) provided on the input shaft (Si), a first ring gear (ZR1) rotatably disposed so as to surround the outer periphery of the first sun gear (ZS1), a plurality of first planetary gears (ZP1) meshing simultaneously with the first sun gear (ZS1) and the first ring gear (ZR1), and a first carrier (C1) rotatably supporting the first planetary gears (ZP1), and; the second planetary gear mechanism (P2) comprising a second sun gear (ZS2) provided on the outer periphery of the first ring gear (ZR0, a second ring gear (ZR2) disposed so as to surround the outer periphery of the second sun gear (ZS2), a plurality of second planetary gears (ZP2) meshing simultaneously with the second sun gear (ZS2) and the second ring gear (ZR2), and a second carrier (C2) rotatably supporting the second planetary gears (ZP2), wherein the input shaft (Si), the first planetary gear mechanism (P1), the second planetary gear mechanism (P2), the motor are completely enclosed in a cylindrical casing, and the first carrier (C1) of the first planetary gear mechanism (P1) is fixed to a casing (41), the second ring gear (ZR2) of the second planetary gear mechanism (P2) is fixed to the casing (41), and the second carrier (C2) of the second planetary gear mechanism (P2) is connected to the output shaft (So).

13. The reduction gear for the walking assistance system according to claim 12, wherein a third planetary gear mechanism (P3) is disposed so as to be coaxial with and be stacked on the first planetary gear mechanism (P1) and the second planetary gear mechanism (P2) in the axis (L) direction, the third planetary gear mechanism (P3) comprising a third sun gear (ZS3) provided on the outer periphery of a central part of the second carrier (C2) of the second planetary gear mechanism (P2), a third ring gear (ZR3) fixed to the casing and disposed so as to surround the outer periphery of the third sun gear (ZS3), a plurality of third planetary gears (ZP3) meshing simultaneously with the third sun gear (ZS3) and the third ring gear (ZR3), and a third carrier (C3) rotatably supporting the third planetary gear (ZP3) and connected to the output shaft (So).

14. The reduction gear for the walking assistance system according to claim 12, wherein the first carrier ($C_1$) is part of a casing of the reduction gear.

15. The reduction gear for the walking assistance system according to claim 12, wherein the first carrier ($C_1$) is non-rotatable.

16. The reduction gear for the walking assistance system according to claim 12, wherein the first carrier ($C_1$) has a diameter larger than a diameter of the second carrier ($C_2$).

* * * * *